US012572457B2

(12) United States Patent

Hsu et al.

(10) Patent No.: US 12,572,457 B2

(45) Date of Patent: Mar. 10, 2026

(54) PROCESSOR SUITABLE FOR MULTI-SEGMENT ACCESSING MEMORY AND OPERATION METHOD THEREOF

(71) Applicant: ANDES TECHNOLOGY CORPORATION, Hsinchu City (TW)

(72) Inventors: Chia-Wei Hsu, Tainan City (TW); Yung-Ching Hsiao, Hsinchu City (TW)

(73) Assignee: ANDES TECHNOLOGY CORPORATION, Hsinchu City (TW)

( * ) Notice: Subject to any disclaimer, the term of this patent is extended or adjusted under 35 U.S.C. 154(b) by 0 days.

(21) Appl. No.: 18/793,948

(22) Filed: Aug. 5, 2024

(65) Prior Publication Data

US 2026/0037422 A1 Feb. 5, 2026

(51) Int. Cl.
*G06F 12/02* (2006.01)

(52) U.S. Cl.
CPC ................................ *G06F 12/0223* (2013.01)

(58) Field of Classification Search
CPC .................................................. G06F 12/0223
See application file for complete search history.

(56) References Cited

U.S. PATENT DOCUMENTS

| | | | |
|---|---|---|---|
| 7,219,215 B2 | 5/2007 | Ford et al. | |
| 9,875,214 B2 | 1/2018 | Eyole et al. | |
| 11,036,502 B2 | 6/2021 | Grocutt | |
| 2005/0125647 A1* | 6/2005 | Symes ..................... | G06F 7/768 |
| | | | 712/300 |

| | | | |
|---|---|---|---|
| 2014/0115227 A1* | 4/2014 | Ingle ................... | G06F 9/30043 |
| | | | 711/E12.001 |
| 2017/0269832 A1* | 9/2017 | Rozin ................ | H03H 17/0223 |
| 2019/0369994 A1* | 12/2019 | Parandeh Afshar .. | G06F 9/3012 |

FOREIGN PATENT DOCUMENTS

| | | |
|---|---|---|
| CN | 110235099 | 9/2019 |
| TW | 201729080 | 8/2017 |
| TW | 201732578 | 9/2017 |
| TW | 202107275 | 2/2021 |
| TW | 1819683 | 10/2023 |

OTHER PUBLICATIONS

"Office Action of Taiwan Counterpart Application", issued on Dec. 12, 2025, p. 1-p. 11.

* cited by examiner

*Primary Examiner* — Michael Krofcheck

(74) *Attorney, Agent, or Firm* — JCIPRNET

(57) ABSTRACT

A processor and an operation method thereof may access a memory in multiple segments. The processor includes a vector register file (VRF) and a load-store device. When the load-store device performs a multi-segment load on the memory, the load-store device reads a plurality of data elements from a source segment of the memory, and then writes the data elements in the VRF within a single write cycle, so that the data elements are written in a same location in different vector registers of the VRF. When the load-store device performs a multi-segment store on the memory, the load-store device reads a plurality of data elements from the VRF within a single read cycle (the data elements are data elements of a same location in different vector registers), and then writes the data elements in a target segment of the memory.

27 Claims, 32 Drawing Sheets

| | | | |
|---|---|---|---|
| V0.E0' | V0.E1' | V0.E2' | V0.E3' |
| V1.E0' | V1.E1' | V1.E2' | V1.E3' |
| V2.E0' | V2.E1' | V2.E2' | V2.E3' |
| V3.E0' | V3.E1' | V3.E2 | V3.E3 |

VR0 VR1 VR2 VR3

130

150

10

PROCESSOR SUITABLE FOR MULTI-SEGMENT ACCESSING MEMORY AND OPERATION METHOD THEREOF

BACKGROUND OF THE INVENTION

Field of the Invention

The invention relates to an electronic circuit, and in particular to a processor suitable for accessing a memory and an operation method thereof.

Description of Related Art

A processor such as an artificial intelligence (AI) chip may provide a large amount of computing power, and the computing power thereof comes from a large number of internal hardware functional units, such as an integer (INT) calculation unit, a floating point (FP) calculation unit, a vector calculation unit, and (or) other functional units. A program may implement various calculations (such as general calculations, scientific calculations, neural network calculations, or other calculations) by adopting various types of functional units. During the calculation process, the processor needs to load data from the memory to the register file (RF) inside the processor, or store the data in the register file to the memory. For example, in many application scenarios, the processor needs to load a plurality of vectors from the memory to the vector register file (VRF) inside the processor, or store a plurality of vectors from the vector register file to the memory. How to efficiently perform multi-vector access on the memory is one of many technical issues in the art.

SUMMARY OF THE INVENTION

The invention provides a processor suitable for accessing a memory and an operation method thereof, so as to load a plurality of vectors from the memory to a vector register file, and (or) store a plurality of vectors from the vector register file to the memory.

In an embodiment of the invention, a processor includes a vector register file (VRF) and a load-store device. The load-store device is coupled to the vector register file. The load-store device performs a multi-segment access on the memory. When the multi-segment access is a multi-segment load, the load-store device reads a plurality of first data elements from a source segment of the memory, and the load-store device writes the first data elements in the vector register file within a same write cycle, so that the first data elements are written in a same location in different vector registers of the vector register file. When the multi-segment access is a multi-segment store, the load-store device reads a plurality of second data elements from the vector register file within a same read cycle. The second data elements are data elements of a same location in different vector registers of the vector register file. The load-store device writes the second data elements in a target segment of the memory.

In an embodiment of the invention, an operation method includes: performing a multi-segment access on a memory via a load-store device; reading a plurality of first data elements from a source segment of the memory and writing the first data elements in a vector register file within a same write cycle in response to the multi-segment access being a multi-segment load, so that the first data elements are written in a same location in different vector registers of the vector register file; and reading a plurality of second data elements from the vector register file and writing the second data elements in a target segment of the memory within a same read cycle in response to the multi-segment access being a multi-segment store, wherein the second data elements are data elements of a same location in different vector registers of the vector register file.

In an embodiment of the invention, a processor includes a vector register file (VRF) and a load-store device. The load-store device is coupled to the vector register file. The load-store device includes a plurality of register pipelines. When the load-store device performs a multi-segment load on the memory, input terminals of the register pipelines are used to receive a plurality of data elements from a same source segment of the memory within a same load cycle, and numbers of stages of the register pipelines are different from each other, so that output terminals of the register pipelines output a plurality of data elements from different source segments of the memory to different locations in different vector registers of the vector register file within a same write cycle. When the load-store device performs a multi-segment store on the memory, input terminals of the register pipelines are used to receive a plurality of data elements from different locations in different vector registers of the vector register file within a same read cycle, and numbers of stages of the register pipelines are different from each other, so that output terminals of the register pipelines output a plurality of data elements from a same location in different vector registers of the vector register file to a same target segment of the memory within a same store cycle.

Based on the above, the load-store device may access a plurality of data elements of the same segment of the memory within the same cycle. Generally, data elements of the same location in different vector registers are placed in the same segment of the memory as different field data in the same segment. In some embodiments, the load-store device rotates different vector registers of the vector register file in units of data elements by different rotation amounts. After the rotation, the load-store device writes a plurality of data elements from the same segment of the memory in different locations in different vector registers of the vector register file within the same write cycle, or reads data elements of different locations in different vector registers of the vector register file to the same segment of the memory within the same read cycle. In some other embodiments, the load-store device may temporarily store different data elements using a plurality of register pipelines having different numbers of stages. When multi-segment load is performed, a plurality of data elements of the same segment of the memory are temporarily stored in the first stages of the register pipelines, and the final stages of the register pipelines output different field data (data elements) from different source segments of the memory to different locations in different vector registers of the vector register file within one write cycle. When multi-segment store is performed, data elements of different locations in different vector registers of the vector register file are read out to the first stages of the register pipelines within one read cycle, and the final stages of the register pipelines output data elements from the same location in different vector registers of the vector register file to the same target segment of the memory. Therefore, the load-store device may load a plurality of vectors from the memory to the vector register file and (or) store a plurality of vectors from the vector register file to the memory.

In order to make the aforementioned features and advantages of the disclosure more comprehensible, embodiments accompanied with figures are described in detail below.

DESCRIPTION OF THE EMBODIMENTS

Figure 1:
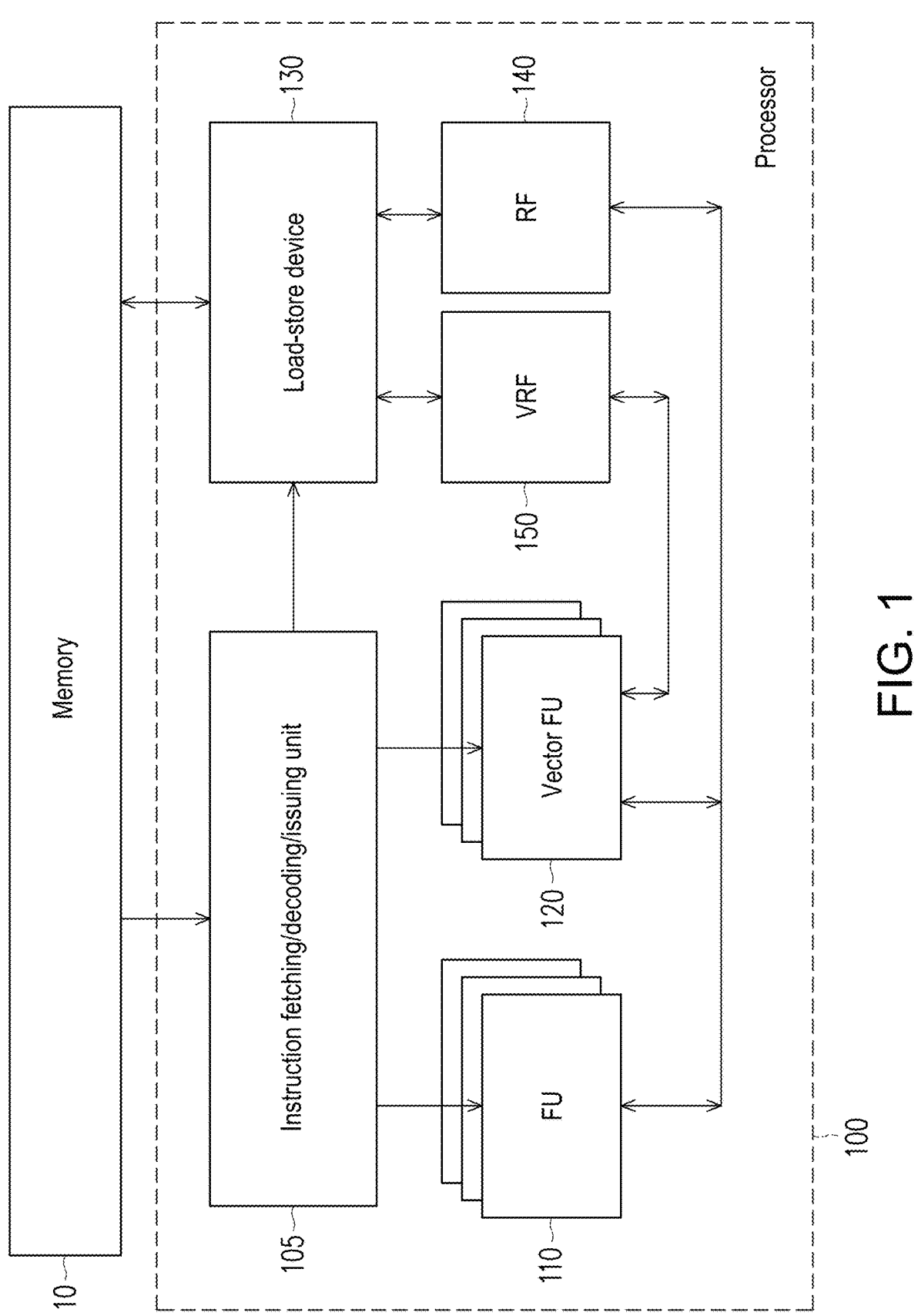
FIG. 1 is a schematic circuit block diagram of a processor according to an embodiment of the invention.

The term "coupled (or connected)" used throughout the specification (including the claims) of the present application may refer to any direct or indirect connection means. For example, if it is herein described that a first device is coupled (or connected) to a second device, it should be interpreted that the first device may be directly connected to the second device, or the first device may be indirectly connected to the second device via other devices or some connection means. Terms such as "first" and "second" mentioned throughout the specification (including the claims) of the present application are used to name elements or to distinguish between different embodiments or scopes, and are not used to limit the upper bound or the lower bound of the number of elements, nor used to limit the sequence of elements. In addition, wherever possible, elements/members/steps using the same reference numerals in the drawings and embodiments denote the same or similar parts. Cross-reference may be made to related descriptions of elements/members/steps using the same reference numerals or using the same terms in different embodiments.

FIG. 1 is a schematic circuit block diagram of a processor 100 according to an embodiment of the invention. The processor 100 may be a general-purpose processor or a special-purpose processor. The general-purpose processor may include a central processing unit or other general-purpose processors. The special-purpose processor may include a network processor, a communication processor, a digital signal processor (DSP), an embedded processor, or other special-purpose processors. The processor 100 may have any of the following instruction set architecture: complex instruction set computing (CISC), reduced instruction set computing (RISC), very long instruction word (VLIW), a mixed instruction set architecture of CISC and RISC, or other types of instruction set architectures. Depending on the actual design, the processor 100 may be a single instruction multiple data (SIMD) processor, a vector processor, or other processors. The processor 100 may access a memory 10. For example, the processor 100 may read programming codes from the memory 10 and execute the programming codes. During the execution of the programming codes, the processor 100 may read data elements from the memory 10 and (or) write data elements back in the memory 10.

The processor 100 shown in FIG. 1 includes an instruction fetching/decoding/issuing unit 105, a functional unit (FU) 110, a vector FU 120, a load-store device 130, a register file (RF) 140, and a vector register file (VRF) 150. The functional unit 110 and (or) the vector functional unit 120 may include an integer calculation unit, a floating-point calculation unit, and (or) other calculation units. The instruction fetching/decoding/issuing unit 105 may retrieve instructions from the memory 10 via an instruction cache (not shown). The instruction fetching/decoding/issuing unit 105 may decode the instructions fetched from the memory 10, and then control the functional unit 110, the vector functional unit 120, and the load-store device 130 according to the decoding result. Based on the decoding result, the functional unit 110 and/or the vector functional unit 120 may perform related calculation operations of the read instructions.

The load-store device 130 is coupled between the register file 140 and the memory 10. According to the actual design, the register file 140 includes an integer register file, a floating-point register file, and (or) other register files. The data width of the register file 140 may be 32 bits, 64 bits, or other widths. When an instruction needs to read the data elements in the memory 10, based on the control of the instruction fetching/decoding/issuing unit 105, the load-store device 130 may read the data elements from the memory 10, and then write the data elements in the register file 140. Based on the operation of instructions, the functional unit 110 and the vector functional unit 120 may obtain data elements from the register file 140. After the instruction is executed, the functional unit 110 and the vector functional unit 120 may write the processing results back in the register file 140. Either one of the functional unit 110 and the vector functional unit 120 may access a set of data elements to the register file 140 within one cycle.

The load-store device 130 is coupled between the vector register file 150 and the memory 10. According to the actual design, the vector register file 150 includes an integer vector register file, a floating-point vector register file, and (or) other vector register files. The data width of each vector register file 150 may be greater than the data width of the register file 140. For example, the data width of the vector register file 150 may be 256 bits, 512 bits, or other widths. When the current instruction (such as a vector processing instruction) needs to read the vector (a plurality of data elements) in the memory 10, based on the control of the instruction fetching/decoding/issuing unit 105, the load-store device 130 may read the data elements of the vector from the memory 10 and then write the data elements in the vector register file 150. Based on the operation of the vector processing instruction, the vector functional unit 120 may obtain a plurality of data elements (the first data elements) from the vector register file 150. After the vector processing instruction is executed, the vector functional unit 120 may write the processing result (the second data elements) back in the vector register file 150.

Based on the control of the instruction fetching/decoding/issuing unit 105, the load-store device 130 may access the memory 10 via a data cache (not shown). For example, in some operating scenarios, the load-store device 130 may read the data elements in the memory 10 via the data cache, and then load the data elements into the register file 140 or the vector register file 150. In some other operating scenarios, the load-store device 130 may read the data elements from the register file 140 or the vector register file 150, and then store the data elements into the memory 10 via the data cache.

According to the actual design, the processor 100 shown in FIG. 1 may be packaged as a single integrated circuit. However, the implementation of the invention should not be limited to the embodiment shown in FIG. 1. In some other embodiments, the load-store device 130 and the vector register file 150 may be packaged as different integrated circuits. For example, the load-store device 130 may be applied to a direct memory access (DMA) controller or other memory access circuits.

Figure 2:
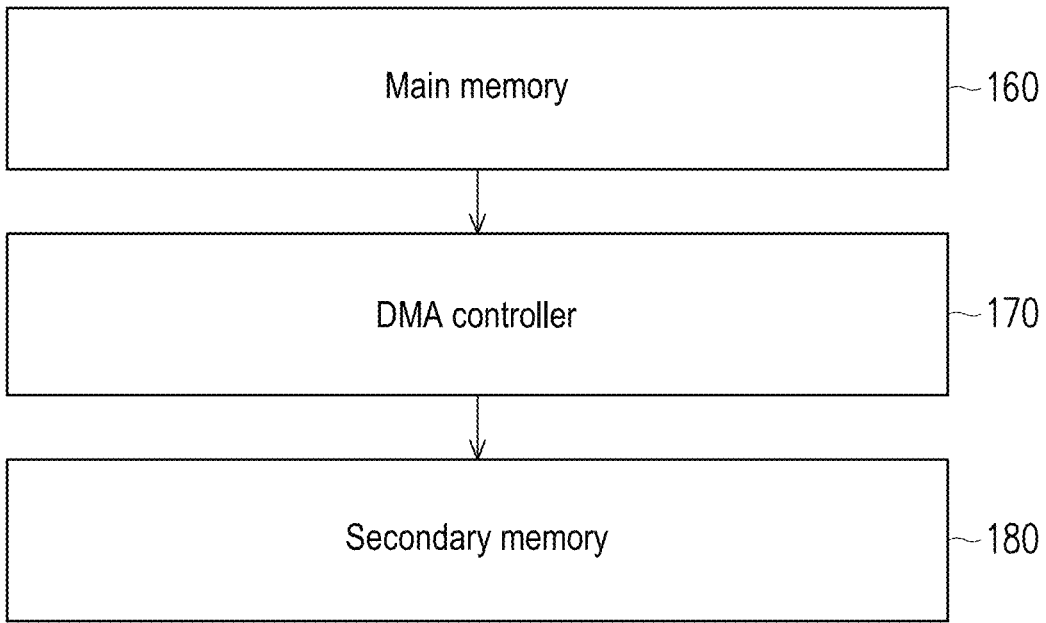
FIG. 2 is a schematic circuit block diagram of a processor (DMA controller) according to another embodiment of the invention.

FIG. 2 is a schematic circuit block diagram of a processor (DMA controller) according to another embodiment of the invention. The electronic equipment shown in FIG. 2 includes a main memory 160, a DMA controller 170 (processor), and a secondary memory 180. The main memory 160 shown in FIG. 2 is as provided in the related description of the memory 10 shown in FIG. 1 and may be analogized as such, the DMA controller 170 shown in FIG. 2 is as provided in the related description of the load-store device 130 shown in FIG. 1 and may be analogized as such, and the secondary memory 180 shown in FIG. 2 is as provided in the related description of the vector register file 150 shown in FIG. 1 and may be analogized as such, and therefore no further description is given here.

Figure 3:
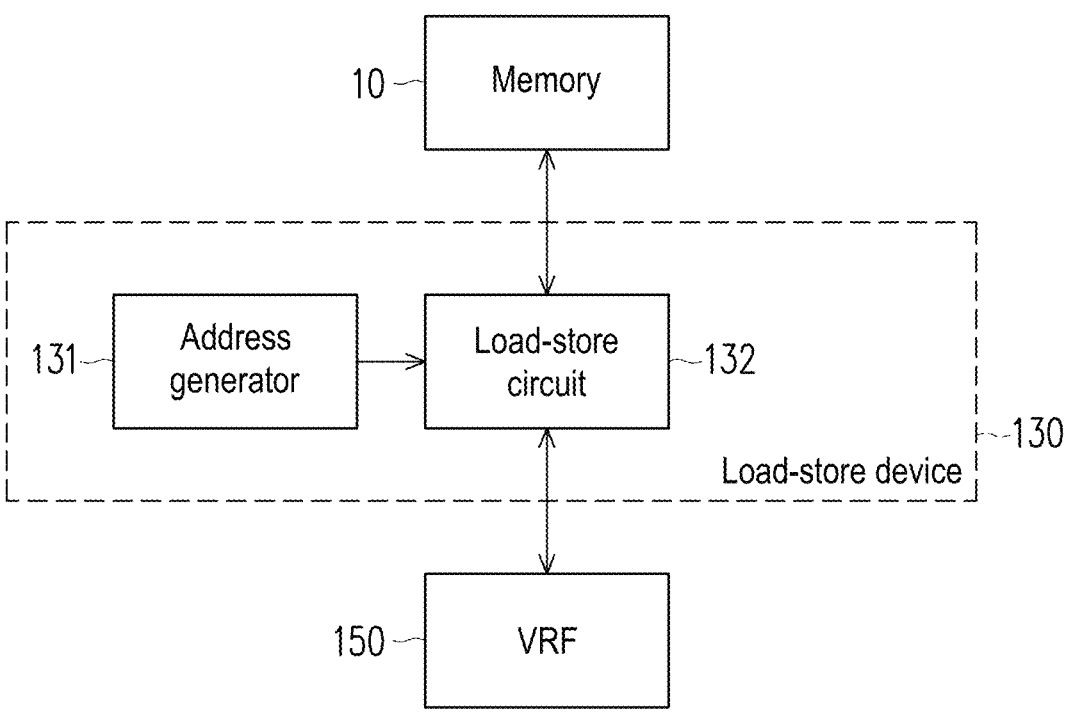
FIG. 3 is a schematic circuit block diagram of a load-store device according to an embodiment of the invention.

FIG. 3 is a schematic circuit block diagram of a load-store device 130 according to an embodiment of the invention. The load-store device 130 shown in FIG. 3 may be used as one of many implementation examples of the load-store device 130 shown in FIG. 1 (or the DMA controller 170 shown in FIG. 2). The memory 10 shown in FIG. 3 is as provided in the related description of the memory 10 shown in FIG. 1, the load-store device 130 shown in FIG. 3 is as provided in the related description of the load-store device 130 shown in FIG. 1, and the vector register file 150 shown in FIG. 3 is as provided in the related description of the vector register file 150 shown in FIG. 1, and therefore no further description is given here.

The load-store device 130 shown in FIG. 3 includes an address generator 131 and a load-store circuit 132. The address generator 131 may generate an access address. The load-store circuit 132 is coupled to the address generator 131 to receive the access address. When the load-store device 130 is to load the data elements of a plurality of segments of the memory 10 into the vector register file 150, the load-store circuit 132 may read a plurality of data elements of a certain segment in the segments of the memory 10 according to the access address, and then write the data elements in the vector register file 150. Or, when the load-store device 130 is to store a plurality of data elements of the vector register file 150 into the memory 10, the load-store circuit 132 may read the data elements from the vector register file 150, and then write the data elements in a certain segment in the memory 10 according to the access address. According to different designs, in some embodiments, the load-store device 130, the address generator 131, and (or) the load-store circuit 132 may be implemented as hardware circuits.

In terms of hardware form, the load-store device 130, the address generator 131, and (or) the load-store circuit 132 may be implemented as a logic circuit on an integrated circuit. For example, the related functions of the load-store device 130, the address generator 131, and (or) the load-store circuit 132 may be implemented as various logic blocks, modules, and circuits in one or a plurality of controllers, microcontrollers, microprocessors, application-specific integrated circuits (ASICs), digital signal processors (DSPs), field-programmable gate arrays (FPGAs), central processing units (CPUs), and/or other processing units. The related functions of the load-store device 130, the address generator 131, and (or) the load-store circuit 132 may be implemented as hardware circuits, such as various logic blocks, modules, and circuits in an integrated circuit, by utilizing a hardware description language (e.g., Verilog HDL or VHDL) or other suitable programming languages.

The vector register file 150 includes a plurality of vector registers, and a length VLEN of each vector register may be determined according to the actual design. For example, the length VLEN of the vector register may be 256 bits, 512 bits, or other widths. One vector register may store a plurality of data elements. The length of one vector, also known as vector length (VL), may be any number of data elements determined according to the actual program application.

Figure 4:
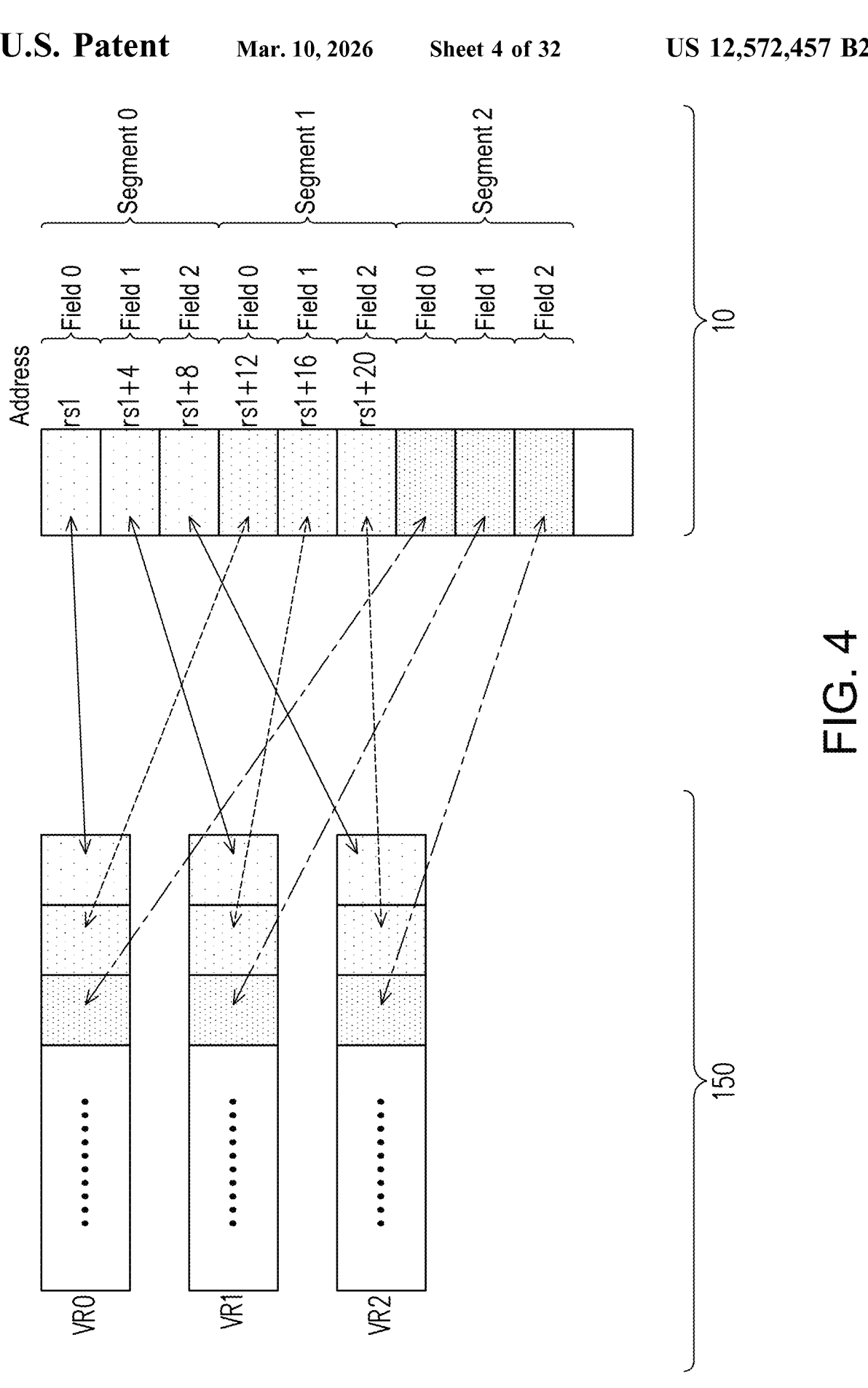
FIG. 4 is a schematic diagram of a specific example of vector access shown according to an embodiment of the invention.

FIG. 4 is a schematic diagram of a specific example of vector access shown according to an embodiment of the invention. FIG. 4 shows vector access in vector unit-stride segment mode. Please refer to FIG. 3 and FIG. 4. In the vector unit-stride segment mode, the memory 10 includes a plurality of consecutive segments (e.g., segment 0, segment 1, and segment 2 shown in FIG. 4), and each segment includes a plurality of consecutive fields (such as field 0, field 1, and field 2 shown in FIG. 4). The length of each field (data element) may be determined according to the actual program application. For example, in some application scenarios, each field length (i.e., effective element width, EEW) may be 32 bits or other lengths.

The address generator 131 may generate an address to the load-store circuit 132 based on a base address rs1 and the effective element width (EEW). More precisely, the address generator 131 calculates (rs1+(M*EEW*NFIELDS)) to generate the address to the load-store circuit 132, where M represents the "M-th iteration", and NFIELDS represents the number of fields in each segment. The load-store circuit 132 may load different fields (data elements) of the same source segment of the memory 10 from the memory 10 to the same location in different vector registers (for example, the vector registers VR0, VR1, and VR2 shown in FIG. 4) of the vector register file 150 based on the address provided by the address generator 131. Alternatively, the load-store circuit 132 may store data elements from the same location in different vector registers VR0, VR1, and VR2 of the vector register file 150 to one target segment of the memory based on the address provided by the address generator 131.

Figure 5:
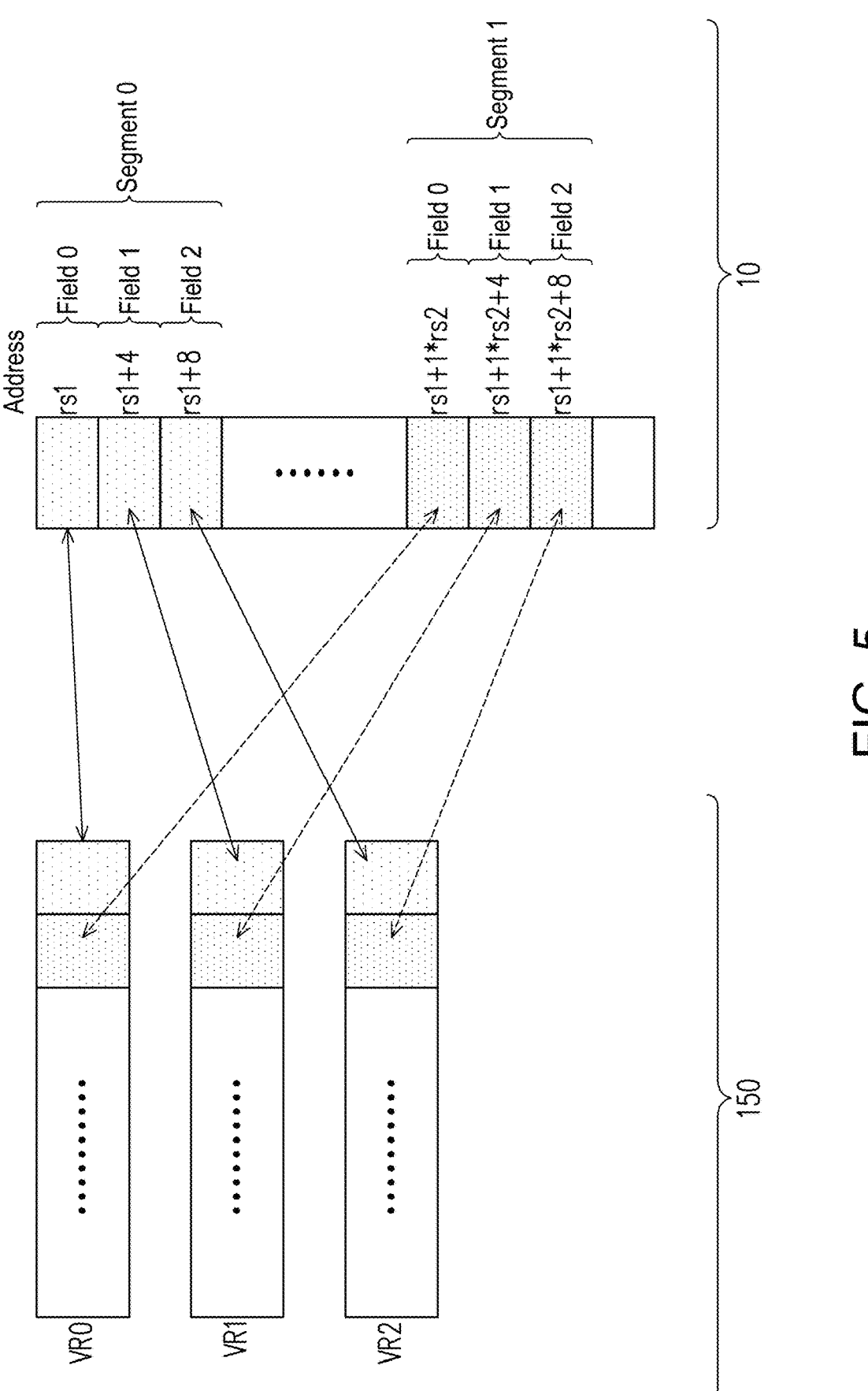
FIG. 5 is a schematic diagram of a specific example of vector access shown according to another embodiment of the invention.

FIG. 5 is a schematic diagram of a specific example of vector access shown according to another embodiment of the invention. FIG. 5 shows vector access in vector strided segment mode. Please refer to FIG. 3 and FIG. 5. In the vector strided segment mode, the memory 10 includes a plurality of consecutive segments (e.g., segment 0 and segment 1 shown in FIG. 5), and each segment includes a plurality of consecutive fields (such as field 0, field 1, and field 2 shown in FIG. 5). For each field shown in FIG. 5, reference may be made to the related description of the fields shown in FIG. 4, and therefore no details are given here. The address generator 131 may generate an address to the load-store circuit 132 based on the base address rs1 and a stride (or offset) rs2. More precisely, the address generator 131 calculates (rs1+(M*rs2)) to generate the address to the load-store circuit 132, where M represents the "M-th iteration". The load-store circuit 132 may load different fields (data elements) of the same segment of the memory 10 from the memory 10 to the same location in different vector registers (for example, the vector registers VR0, VR1, and VR2 shown in FIG. 5) of the vector register file 150 based on the address provided by the address generator 131. Alternatively, the load-store circuit 132 may store data elements from the same location in different vector registers VR0, VR1, and VR2 of the vector register file 150 to the same target segment of the memory based on the address provided by the address generator 131.

Another embodiment is indexed-LS mode. Different from the vector strided mode shown in FIG. 5, the offset of each segment in the index-LS mode is determined by the vector register VR[n][m] (m-th element of n-th vector register), or determined by other methods (for example, the value of a specific address of the memory). The "m" here corresponds to the "m-th iteration", which is the offset of the m-th segment. "n" here is any vector register VR. In indexed-LS mode, the offset may be not limited to a fixed value.

Figure 6:
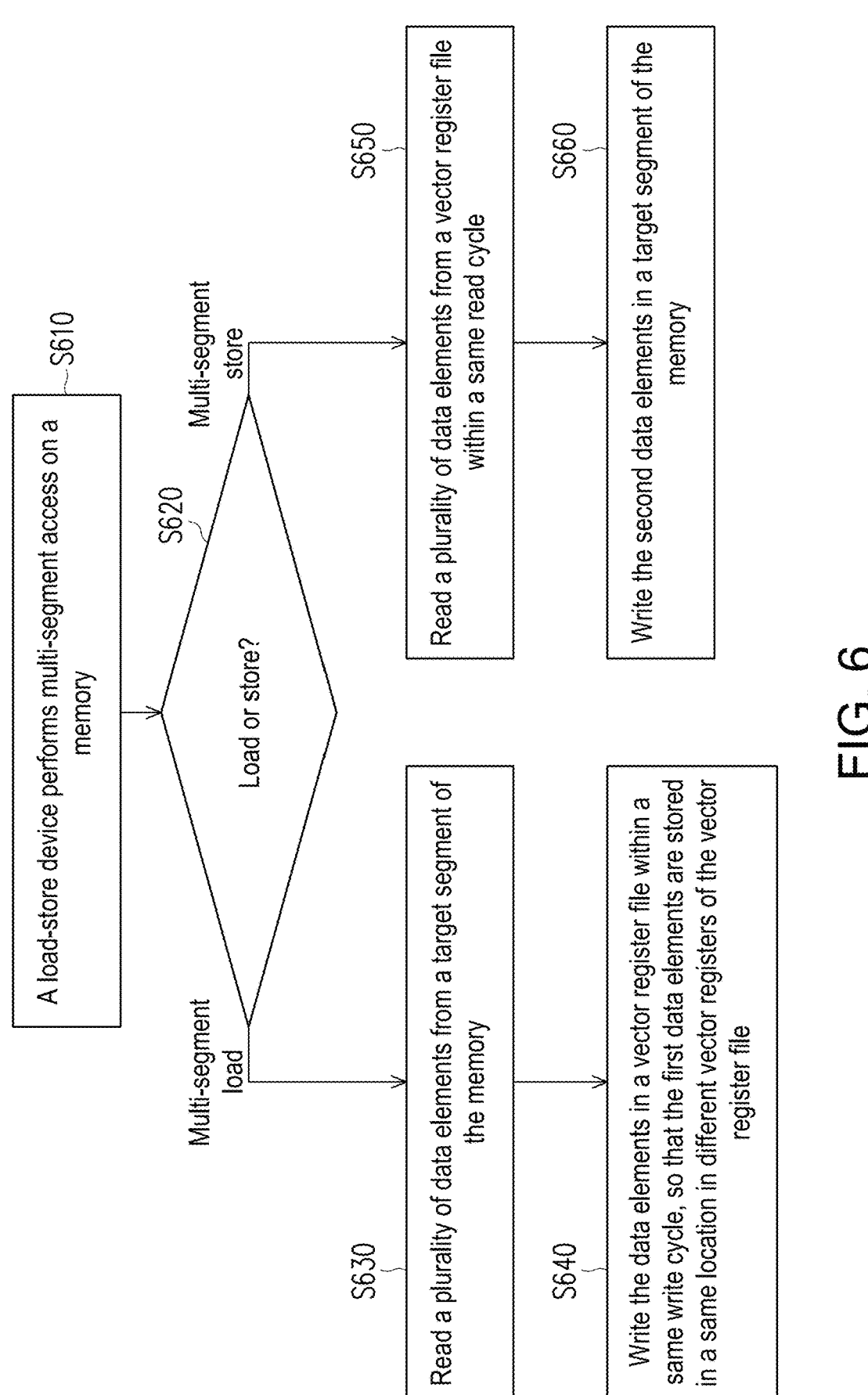
FIG. 6 is a schematic flowchart of an operation method of a processor according to an embodiment of the invention.

FIG. 6 is a schematic flowchart of an operation method of a processor according to an embodiment of the disclosure. Referring to FIG. 3 and FIG. 6, in step S610, the load-store device 130 may perform multi-segment access on the memory 10. In response to the multi-segment access being a multi-segment load (the determination result of step S620 is "multi-segment load"), the load-store device 130 may read a plurality of first data elements (field data) from the first source segment of the memory 10 (step S630), and write the first data elements in different vector registers of the vector register file 150 within the same write cycle, so that the first data elements are written in the same location in different vector registers of the vector register file 150 (step S640).

In other implementation scenarios, the load-store device 130 may write the first data elements in different vector registers of the vector register file 150 within different write cycles. For some special configurations, for example, the vector register length VLEN is very small (for example, 128 bits) but the number of fields NFIELD is large (for example, NFIELD=8), if the effective element width EEW is 32 bits, it may take 2 write cycles to write the first data elements in different vector registers of the vector register file 150 (assuming that a maximum of 128 bits may be written at one time, 8*32=256, and two writes are needed).

In response to the multi-segment access being multi-segment store (the determination result of step S620 is "multi-segment store"), the load-store device 130 may read a plurality of second data elements from different vector registers of the vector register file 150 within the same read cycle (step S650), and write the second data elements in the second target segment of the memory 10 (step S660). In particular, the second data elements are data elements of the same location in different vector registers of the vector register file 150. In other implementation scenarios, the load-store device 130 may read a plurality of second data elements from different vector registers of the vector register file 150 within different read cycles.

Figure 7:
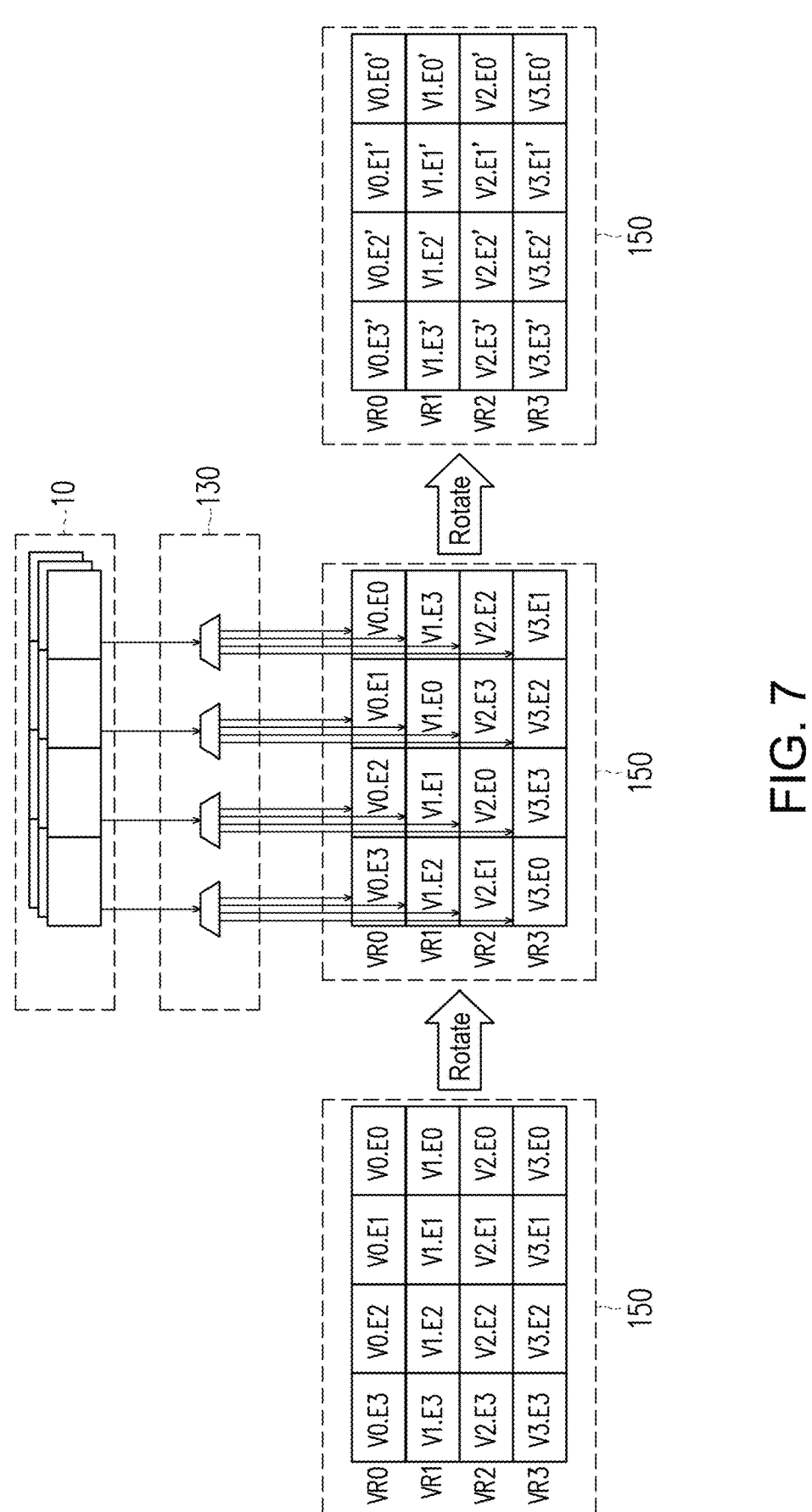
FIG. 7 is a schematic diagram of the operation of a load-store device performing multi-segment load on a memory shown according to an embodiment of the invention.

FIG. 7 is a schematic diagram of the operation of the load-store device 130 performing multi-segment load on the memory 10 shown according to an embodiment of the invention. For convenience of explanation, in the embodiment shown in FIG. 7, the vector length VL is assumed to be 4, and the number of fields NFIELDS in each segment is assumed to be 4. When the load-store device 130 performs multi-segment load on the memory 10, the load-store device 130 performs a first rotation on a plurality of data elements of different vector registers of the vector register file 150 in a first direction by different rotation amounts (for example, the rotation operation shown at the left side of the lower portion of FIG. 7).

For convenience of explanation, in the embodiment shown in FIG. 7, the vector register file 150 is assumed to have vector registers VR0, VR1, VR2, and VR3. Each vector register has four data elements. For example, as shown at the lower left side of FIG. 7, the vector register VR0 has data elements V0.E3, V0.E2, V0.E1, and V0.E0, the vector register VR1 has data elements V1.E3, V1.E2, V1.E1, and V1.E0, the vector register VR2 has data elements V2.E3, V2.E2, V2.E1, and V2.E0, and the vector register VR3 has data elements V3.E3, V3.E2, V3.E1, and V3.E0. The load-store device 130 performs the first rotation on the data elements of each of the vector registers VR0 to VR3 of the vector register file 150 in the left direction by different rotation amounts (the rotation results are shown in the lower center of FIG. 7). For example, the data elements V0.E3 to V0.E0 of the vector register VR0 are rotated in the left direction by a rotation amount of "0" (that is, there is no rotation), the data elements V1.E3 to V1.E0 of the vector register VR1 are rotated in the left direction by a rotation amount "one data element", the data elements V2.E3 to V2.E0 of the vector register VR2 are rotated in the left direction by the rotation amount "two data elements", and the data elements V3.E3 to V3.E0 of the vector register VR3 are rotated in the left direction by the rotation amount "three data elements".

Figure 8:
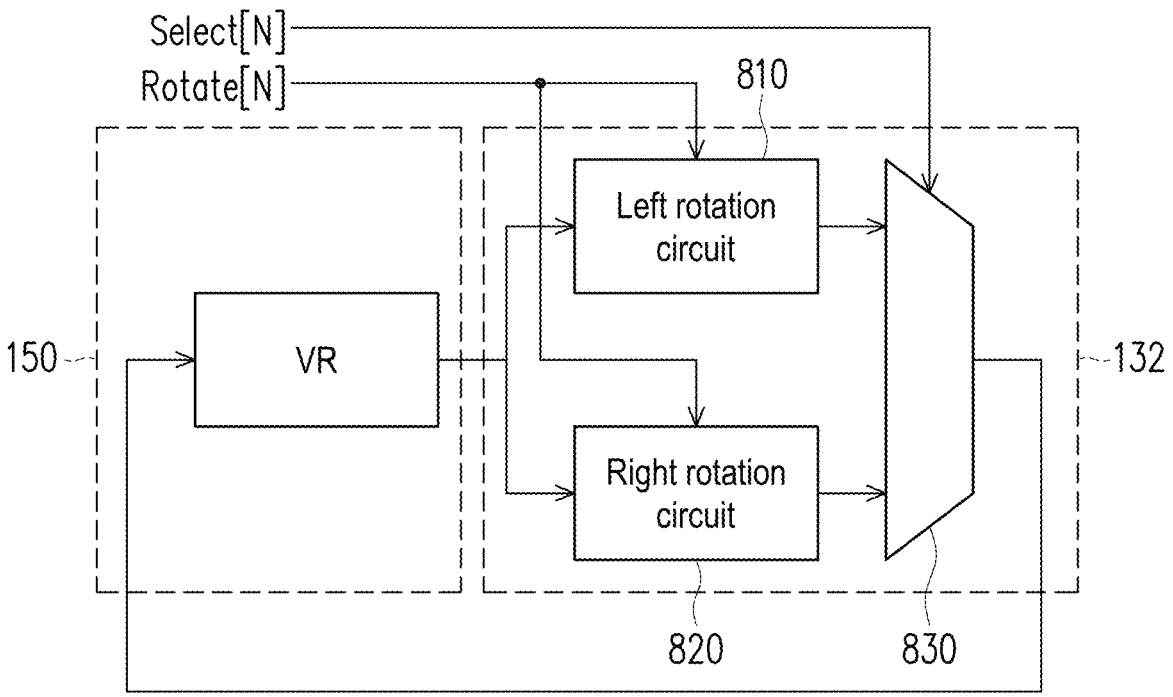
FIG. 8 is a schematic circuit block diagram of a rotation operation circuit of a load-store circuit shown according to an embodiment of the invention.

FIG. 8 is a schematic circuit block diagram of a rotation operation circuit of a load-store circuit 132 shown according to an embodiment of the invention. The rotation operation circuit of the load-store circuit 132 shown in FIG. 8 includes a left rotation circuit 810, a right rotation circuit 820, and a multiplexer 830. The left rotation circuit 810 and the right rotation circuit 820 are coupled to the vector register file 150. The left rotation circuit 810 rotates data elements in different vector registers of the vector register file 150 in the left direction by different rotation amounts. The right rotation circuit 820 rotates data elements in different vector registers of the vector register file 150 in the right direction by different rotation amounts. The first selection terminal of the multiplexer 830 is coupled to the output terminal of the left rotation circuit 810. The second selection terminal of the multiplexer 830 is coupled to the output terminal of the right rotation circuit 820. The output terminal of the multiplexer 830 is coupled to the vector register file 150.

The load-store device 130 controls the left rotation circuit 810, the right rotation circuit 820 and the multiplexer 830 through a selection signal Select[N] and a control signal Rotate[N]. Based on the control of the selection signal Select[N], the multiplexer 830 may select the output of one of the left rotation circuit 810 and the right rotation circuit 820. Based on the control of the control signal Rotate[N], the left rotation circuit 810 and the right rotation circuit 820 may rotate according to the rotation amount corresponding to the control signal Rotate[N]. Taking the first rotation of the vector registers VR0 to VR3 shown in FIG. 7 as an example, the rotation amount of the vector register VR0 is "0". Therefore, the multiplexer 830 selects the output of the left rotation circuit 810 (or the right rotation circuit 820) based on the control of the selection signal Select[N], and the left rotation circuit 810 (or the right rotation circuit 820) determines the rotation amount to be "0" based on the control of the control signal Rotate[N]. The vector register VR1 is rotated in the left direction by "one data element". Therefore, the left rotation circuit 810 rotates the data elements V1.E3 to V1.E0 of the vector register VR1 in the left direction by "one data element" based on the control of the control signal Rotate[N], and the multiplexer 830 selects the output of the left rotation circuit 810 based on the control of the selection signal Select[N]. The vector register VR2 should be rotated in the left direction by "two data elements". Therefore, the left rotation circuit 810 rotates the data elements V2.E3 to V2.E0 of the vector register VR2 in the left direction by "two data elements" based on the control of the control signal Rotate[N], and the multiplexer 830 selects the output of the left rotation circuit 810 based on the control of the selection signal Select[N]. The vector register VR3 should be rotated in the left direction by "three data elements". Therefore, the left rotation circuit 810 rotates the data elements V3.E3 to V3.E0 of the vector register VR3 in the left direction by "three data elements" based on the control of the control signal Rotate[N], and the multiplexer 830 selects the output of the left rotation circuit 810 based on the control of the selection signal Select[N].

Figure 9:
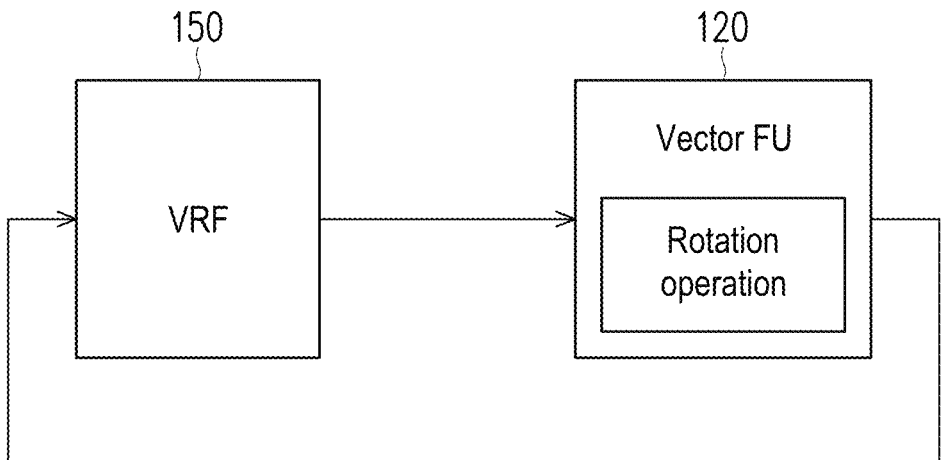
FIG. 9 is a schematic circuit block diagram of implementing a rotation operation using a vector functional unit shown according to another embodiment of the invention.

FIG. 9 is a schematic circuit block diagram of implementing a rotation operation using the vector functional unit 120 shown according to another embodiment of the invention. In the embodiment shown in FIG. 9, the load-store device 130 may implement the rotation operation using the (existing) rotation function in the vector functional unit (VFU) 120, thereby replacing the left rotation circuit 810, the right rotation circuit 820 and the multiplexer 830 in the embodiment shown in FIG. 8. The vector functional unit 120 is coupled to the vector register file 150. Based on the control of the load-store device 130, the vector functional unit 120 may control the rotation direction, and rotate data elements of different vector registers of the vector register file 150 by different rotation amounts.

Here, a specific example is used to describe the operating action of the first rotation on the vector registers VR0 to VR3. The load-store device 130 rotates the contents of one vector register VD[N] (destination vector register) in the vector register file 150 in the left direction by the rotation amount "EEW*N", wherein the EEW is the effective element width (unit: bits). The number of fields in each segment of the memory 10 is NFIELDS fields (NFIELDS is an integer greater than 1, which is determined according to the actual program application). Currently, the vector register may be represented by VD[N], and N is an integer from 0 to NFIELDS−1. Taking FIG. 7 as an example, when N is 0, the vector register VD[0] may be the vector register VR0 shown in FIG. 7. When N is 0, the load-store device 130 rotates the contents of the vector register VR0 (i.e., the vector register VD[0]) in the left direction by the rotation amount "EEW*0 bits (that is, zero data elements)". When N is 1, the load-store device 130 rotates the contents of the vector register VR1 (i.e., the vector register VD[1]) in the left direction by the rotation amount "EEW*1 bit (that is, one data element)".

Please refer to FIG. 7. After the first rotation is performed on the vector registers VR0 to VR3, the load-store device 130 may perform a plurality of write operations. In each write operation, the load-store device 130 may write different fields (first data elements) of a certain source segment of the memory 10 in different locations in different vector registers of the vector register file 150 within the same write cycle. For example, the load-store device 130 may perform VL load iterations to load the contents of the VL source segments of the memory 10 into different vector registers of the vector register file 150, wherein VL is the vector length (unit is the number of elements). The J-th iteration in the VL load iterations may load data elements from the same source segment (for example, the J-th segment in the memory 10) of the memory 10 in different locations in different vector registers of the vector register file 150 within the same write cycle, wherein J is an integer from 0 to VL−1. The following paragraph explains the operation of the J-th iteration.

The load-store device 130 reads a plurality of data elements M_D[J][0] to M_D[J][NFIELDS−1] from the J-th source segment in the VL source segments of the memory 10, wherein M_D[J][0] represents the data element of field 0 in the J-th source segment of the memory 10, and M_D[J][NFIELDS−1] represents the data element of field NFIELDS−1 in the J-th source segment of the memory 10. Within the same write cycle, the load-store device 130 writes the data elements M_D[J][0] to M_D[J][NFIELDS−1] in different locations in different vector registers of the vector register file 150, wherein the N-th data element M_D[J][N] in the data elements M_D[J][0] to M_D[J][NFIELDS−1] is written in the ((J+N) MOD (VLEN/EEW))-th element location in an N-th vector register VD[N] of the vector register file 150, where MOD represents the modulus (modulo) operator.

Figure 10A:
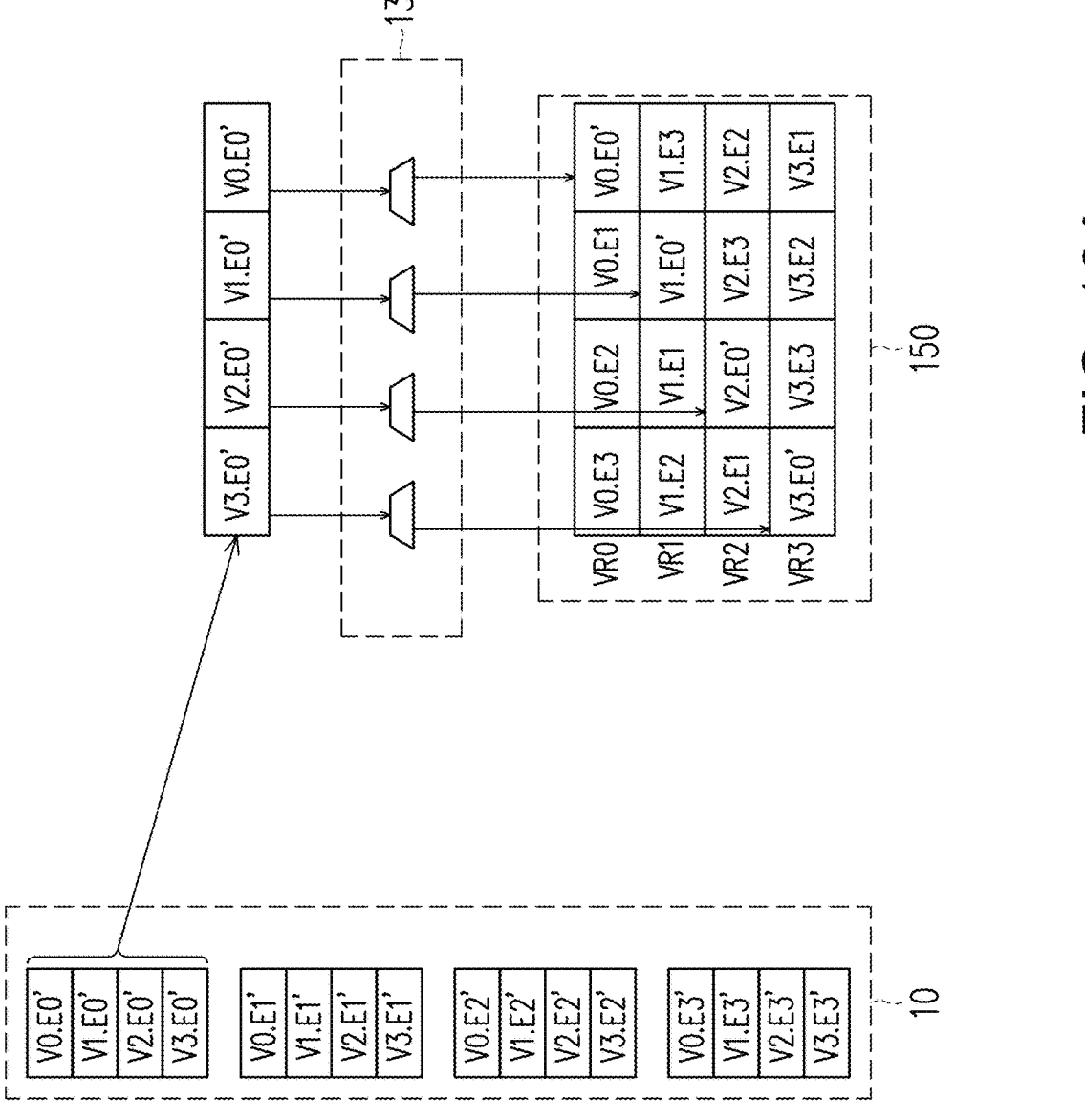
FIG. 10A to FIG. 10B are schematic diagrams of the process of loading the contents of a plurality of source segments of a memory 10 to a vector register file shown according to an embodiment of the invention.
Figure 10B:
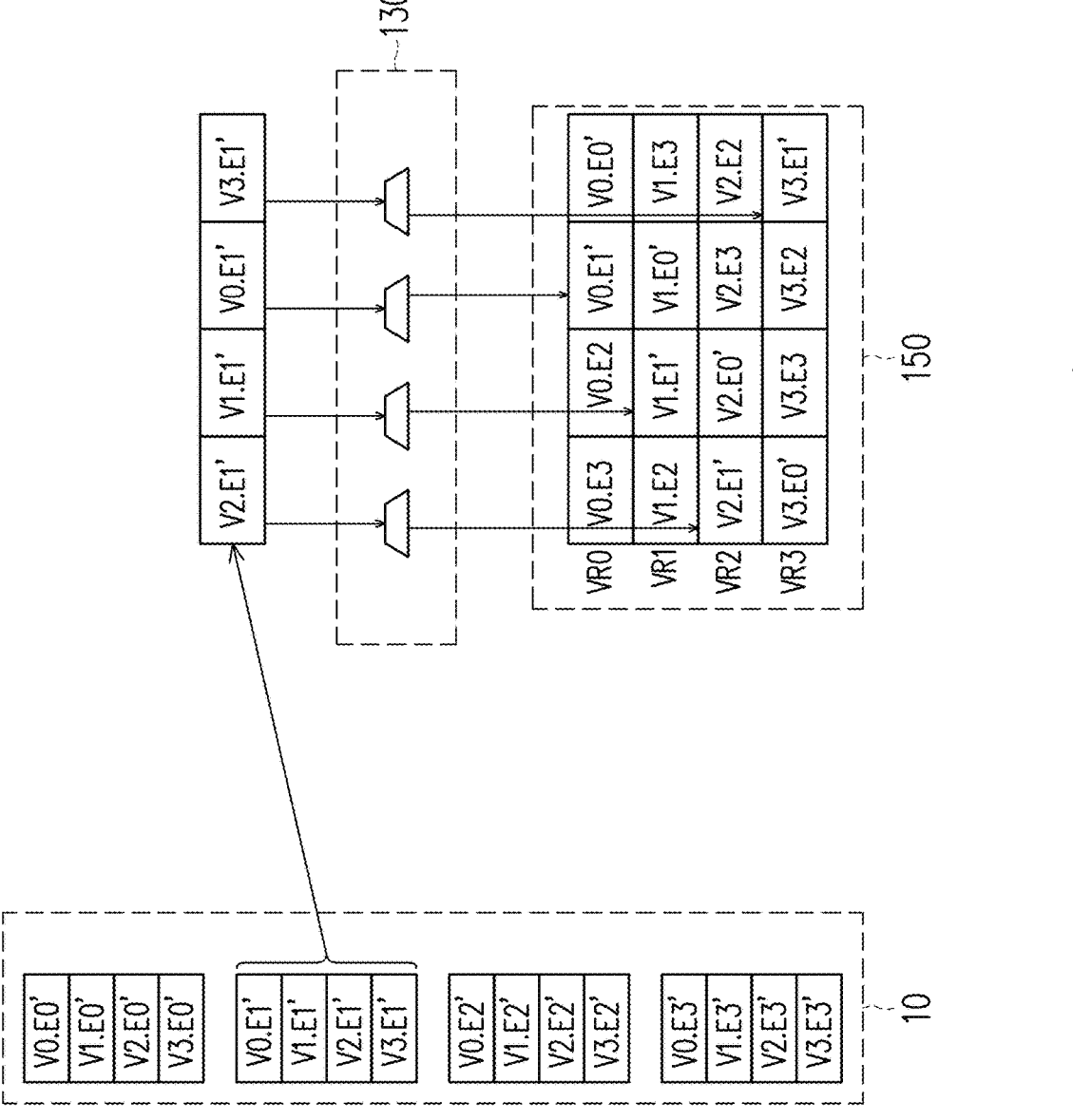

FIG. 10A to FIG. 10B are schematic diagrams of the process of loading the contents of a plurality of source segments of the memory 10 to the vector register file 150 shown according to an embodiment of the invention. For the vector register file 150 shown in FIG. 10A and FIG. 10B, reference may be made to the related description of the vector register file 150 shown in FIG. 7. In the embodiment shown in FIG. 10A to FIG. 10B, the vector length VL is assumed to be 4 (so the memory 10 shown in FIG. 10A to FIG. 10B has 4 source segments), and the number of fields NFIELDS in each segment is assumed to be 4. In the operating scenario shown in FIG. 10A, the load-store device 130 reads a plurality of data elements V3.E0', V2.E0', V1.E0', and V0.E0' from the zeroth source segment of the memory 10. Within the same write cycle, the load-store device 130 writes the data elements V3.E0', V2.E0', V1.E0', and V0.E0' in different locations in different vector registers VR0 to VR3 of the vector register file 150. For example, the data element V2.E0' is written in the second element location in the vector register VR2.

In the operating scenario shown in FIG. 10B, the load-store device 130 reads a plurality of data elements V3.E1', V2.E1', V1.E1', and V0.E1' from the first source segment of the memory 10. Within the same write cycle, the load-store device 130 writes the data elements V3.E1', V2.E1', V1.E1', and V0.E1' in different locations in different vector registers VR0 to VR3 of the vector register file 150. For example, the data element V2.E1' is written in the third element location in the vector register VR2. The second source segment and the third source segment of the memory 10 are as provided in the related descriptions of FIG. 10A to FIG. 10B and may be analogized as such, and therefore are not described again.

This paragraph illustrates that the VL load iterations performed by the load-store device 130 may also take into account a vector mask vm. The vector mask vm may be stored in a predicate register as a bit mask of each data element location in the vector operand. Depending on whether the strategy adopted is mask-undisturbed or mask-agnostic, the load-store device 130 processes destination vector register elements corresponding to masked-off elements. The mask-undisturbed strategy means that the values of elements that do not participate in the operation are not changed. The mask-agnostic strategy refers to filling in a preset value for values of elements that do not participate in the operation, for example, filling in a constant value of 1 in each bit.

If the vector length VL=5, then 5 bits of the vector mask vm are valid. For example, if the vector mask vm is 0b00110 (binary number "00110"), it means that the first and second iterations are valid (that is, the corresponding segments of the first and second iterations need to participate in the operation), and the zeroth, third, and fourth iterations are invalid (that is, the corresponding segments of the zeroth, third, and fourth iterations do not participate in the operation). Data elements M_D[1][0] to M_D[1][3] and data elements M_D[2][0] to M_D[2][3] are written in the vector register file 150. For the mask-agnostic strategy, the memory accesses of the zeroth, third, and fourth iterations may be skipped directly, and the corresponding segments of the zeroth, third, and fourth iterations are directly filled with constant values. For the mask-undisturbed strategy, the memory accesses of the zeroth, third, and fourth iterations may be skipped directly, and the corresponding segments of the zeroth, third, and fourth iterations remain unchanged.

This paragraph illustrates that the VL load iterations performed by the load-store device 130 may also take into consideration a vector field mask vfm to control whether to write back specific fields. The vector field mask vfm may be stored in the predicate register as a bit mask of each data element (field) location in the vector operand. Depending on whether the strategy adopted is mask-undisturbed or mask-agnostic, the load-store device 130 processes destination vector register elements corresponding to masked-off elements. Assume that the number of fields in each segment is 4 (NFIELDS=4), the vector field mask vfm is represented by 0b0101 (binary number "0101"), fields 0 and 2 in the vector need to participate in the operation, and fields 1 and 3 in the vector do not participate in the operation.

Taking the vector mask vm into consideration, the operation of the J-th iteration includes the following. The load-store device 130 checks the vector mask vm. In response to the J-th bit vm[J] in the vector mask vm being the first value (e.g., logic 1), the load-store device 130 reads a plurality of data elements M_D[J][0] to M_D[J][NFIELDS−1] from the J-th source segment in the VL source segments of the memory. The load-store device 130 writes data elements M_D[J][0] to M_D[J][NFIELDS−1] in different locations in different vector registers of the vector register file 150 within the same write cycle. For example, the N-th data element M_D[J][N] in the data elements M_D[J][0] to M_D[J] [NFIELDS−1] is written in the ((J+N) MOD (VLEN/ EEW))-th element location in the N-th vector register VD[N] of the vector register file 150. In response to the J-th bit vm[J] in the vector mask vm being the second value (e.g., logic 0), the load-store device 130 maintains the content of the ((J+N) MOD (VLEN/EEW))-th element location in the N-th vector register VD[N], or writes the constant value (any value determined according to the actual design) in the ((J+N) MOD (VLEN/EEW))-th element location in the N-th vector register VD[N].

Please refer to FIG. 7. After the plurality of write operations are completed, the load-store device 130 rotates the data elements of the different vector registers of the vector register file 150 in the second direction by different rotation amounts, so that the first data elements written within the same write cycle are placed at the same location in different vector registers of the vector register file 150. For example, the load-store device 130 rotates the contents of the vector register VD[N] in the right direction by the rotation amount "EEW*N", wherein N is an integer from 0 to NFIELDS−1, and the vector register VD[N] is one vector register in the vector register file 150. Taking FIG. 7 as an example, when N is 1, the vector register VD[1] may be the vector register VR1 shown in FIG. 7. When N is 1, the load-store device 130 rotates the contents of the vector register VR1 (i.e., the vector register VD[1]) in the right direction by the rotation amount "EEW*1 bit (that is, one data element)".

Figure 11:
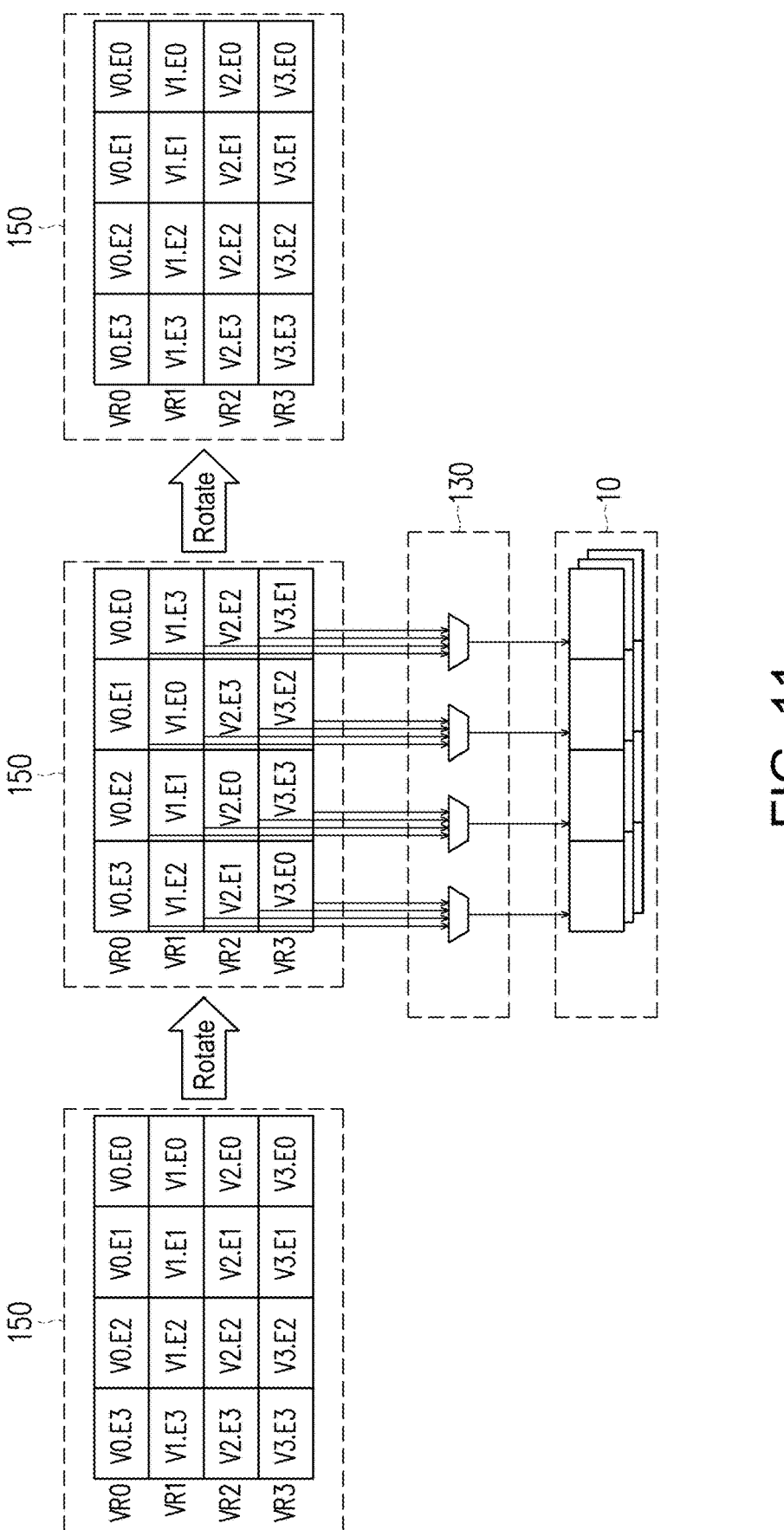
FIG. 11 is a schematic diagram of the operation of a load-store device performing multi-segment store on a memory shown according to an embodiment of the invention.

FIG. 11 is a schematic diagram of the operation of the load-store device 130 performing multi-segment store on the memory 10 shown according to an embodiment of the invention. For convenience of explanation, in the embodiment shown in FIG. 11, the vector length VL is assumed to be 4, and the number of fields NFIELDS in each segment is assumed to be 4. When the load-store device 130 performs multi-segment store on the memory 10, the load-store device 130 performs a first rotation on a plurality of data elements of different vector registers of the vector register file 150 in a first direction by different rotation amounts. For convenience of explanation, in the embodiment shown in FIG. 11, the vector register file 150 is assumed to have vector registers VR0, VR1, VR2, and VR3. Each vector register has four data elements. For example, as shown at the upper left side of FIG. 11, the vector register VR0 has data elements V0.E3, V0.E2, V0.E1, and V0.E0, the vector register VR1 has data elements V1.E3, V1.E2, V1.E1, and V1.E0, the vector register VR2 has data elements V2.E3, V2.E2, V2.E1, and V2.E0, and the vector register VR3 has data elements V3.E3, V3.E2, V3.E1, and V3.E0. The load-store device 130 performs the first rotation on the data elements of each of the vector registers VR0 to VR3 of the vector register file 150 in the left direction by different rotation amounts (the rotation results are shown in the upper center of FIG. 11). For example, the data elements V0.E3 to V0.E0 of the vector register VR0 are rotated in the left direction by a rotation amount of "0" (that is, there is no rotation), the data elements V1.E3 to V1.E0 of the vector register VR1 are rotated in the left direction by a rotation amount "one data element", the data elements V2.E3 to V2.E0 of the vector register VR2 are rotated in the left direction by the rotation amount "two data elements", and the data elements V3.E3 to V3.E0 of the vector register VR3 are rotated in the left direction by the rotation amount "three data elements".

Here, an example is used to illustrate the operating action of the first rotation performed on the vector registers VR0 to VR3. The load-store device 130 rotates the contents of one vector register (source vector register) VS[N] in the vector register file 150 in the left direction by the rotation amount "EEW*N", wherein N is an integer of 0 to NFIELDS−1. Taking FIG. 11 as an example, when N is 2, the vector register VS[2] may be the vector register VR2 shown in FIG. 11. When N is 2, the load-store device 130 rotates the contents of the vector register VR2 (i.e., the vector register VS[2]) in the left direction by the rotation amount "EEW*2 bit (that is, two data elements)".

After the first rotation is performed on the vector registers VR0 to VR3, the load-store device 130 may perform a plurality of read operations. In each read operation, the load-store device 130 may read data elements (second data elements) from different locations in different vector registers of the vector register file 150 within the same read cycle. For example, the load-store device 130 may perform VL store iterations to store the contents of different vector registers of the vector register file 150 to VL target segments of the memory 10. The J-th iteration in the VL store iterations may read the second data elements from the vector register file 150 within the same read cycle to be written in the same target segment of the memory 10, wherein J is an integer from 0 to VL−1. The following paragraph explains the operation of the J-th iteration.

Within the same read cycle, the load-store device 130 reads data elements from different locations in different vector registers of the vector register file 150. The vector register file 150 includes the N-th vector register VS[N], and the data element of the ((J+N) MOD (VLEN/EEW))-th element location in the N-th vector register VS[N] may be expressed as VS[N][(J+N) MOD (VLEN/EEW)], wherein N is an integer from 0 to NFIELDS−1. The load-store device 130 writes data elements of different locations in different vector registers of the vector register file 150 in the J-th target segment in the VL target segments of the memory 10 as a plurality of data elements M_D[J][0] to M_D[J][N−FIELDS−1] of the J-th target segment, wherein M_D[J][0] is the data element of field 0 in the J-th target segment of the memory 10, and M_D[J][NFIELDS−1] is the data element of field NFIELDS−1 in the J-th target segment of the memory 10. The data element VS[N][(J+N) MOD (VLEN/EEW)] of the ((J+N) MOD (VLEN/EEW))-th element location in the N-th vector register VS[N] is written in the J-th target segment of the memory 10 as the N-th data element M_D[J][N] in the data elements M_D[J][0] to M_D[J][NFIELDS−1].

Figure 12A:
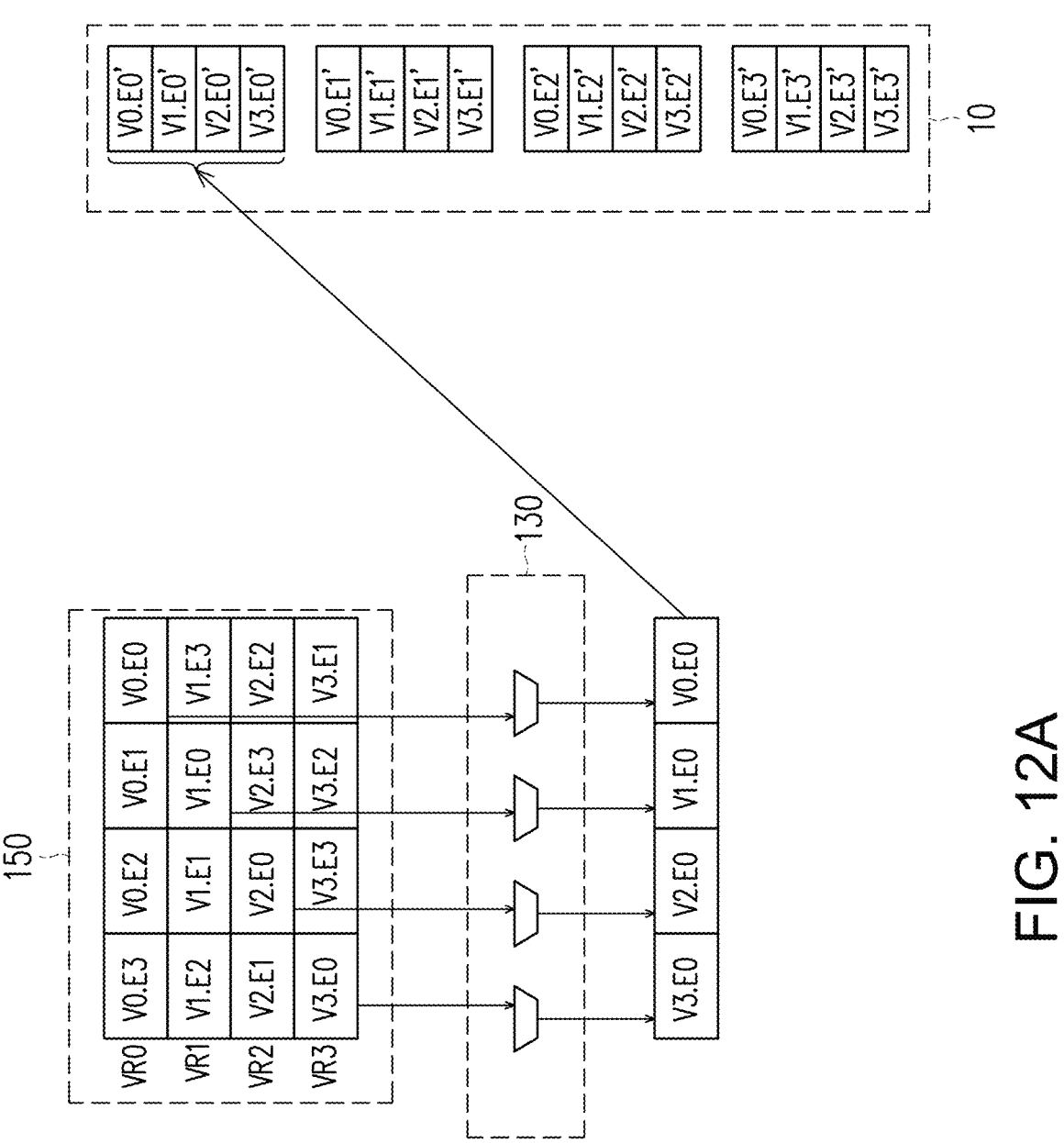
FIG. 12A to FIG. 12B are schematic diagrams of the process of storing the contents of a vector register file to a plurality of target segments of a memory shown according to an embodiment of the invention.
Figure 12B:
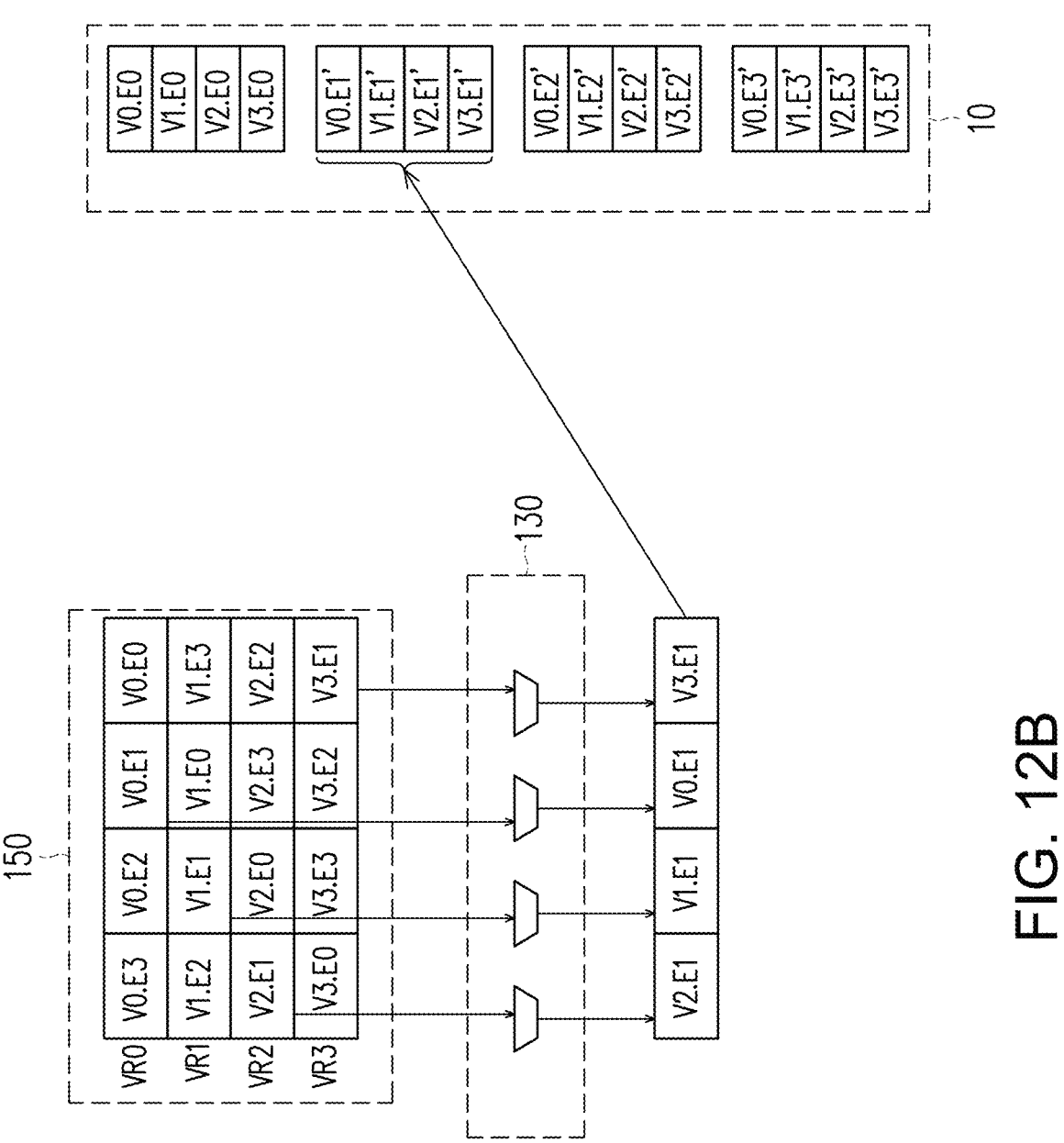

FIG. 12A to FIG. 12B are schematic diagrams of the process of storing the contents of the vector register file 150 to a plurality of target segments of the memory 10 shown according to an embodiment of the invention. For the vector register file 150 shown in FIG. 12A to FIG. 12B, reference may be made to the vector register file 150 shown in FIG. 11. In the embodiment shown in FIG. 12A to FIG. 12B, the vector length VL is assumed to be 4 (therefore, the memory 10 shown in FIG. 12A to FIG. 12B has 4 target segments), and the number of fields NFIELDS in each segment is assumed to be 4. In the operating scenario shown in FIG. 12A, the load-store device 130 may read a plurality of data elements V3.E0, V2.E0, V1.E0, and V0.E0 from different locations in different vector registers of the vector register file 150 within the same read cycle. The load-store device 130 writes the data elements V3.E0, V2.E0, V1.E0, and V0.E0 of the vector register file 150 in the zeroth target segment of the memory 10.

In the operating scenario shown in FIG. 12B, the load-store device 130 may read a plurality of data elements V3.E1, V2.E1, V1.E1, and V0.E1 from different locations in different vector registers of the vector register file 150 within the same read cycle. The load-store device 130 writes the data elements V3.E1, V2.E1, V1.E1, and V0.E1 of the vector register file 150 in the first target segment of the memory 10. The second target segment and the third target segment of the memory 10 are as provided in the related descriptions of FIG. 12A to FIG. 12B and may be analogized as such, and therefore are not described again.

This paragraph illustrates that the VL load iterations performed by the load-store device 130 may also take into account the vector mask vm. Taking the vector mask vm into consideration, the operation of the J-th iteration of the multi-segment store includes the following. The load-store device 130 checks the vector mask vm. In response to the J-th bit vm[J] in the vector mask vm being the first value (e.g., logic 1), the load-store device 130 reads data elements from different locations in different vector registers of the vector register file 150 within the same read cycle. In response to the J-th bit vm[J] in the vector mask vm being the first value, the load-store device 130 writes data elements of different locations in different vector registers of the vector register file 150 in the J-th target segment of the memory 10 as a plurality of data elements M_D[J][0] to M_D[J][NFIELDS−1] of the J-th target segment. For example, the data element VS[N][(J+N) MOD (VLEN/EEW)] of the ((J+N) MOD (VLEN/EEW))-th element location in the N-th vector register VS[N] is written in the J-th target segment of the memory 10 as the N-th data element M_D[J][N] in the data elements M_D[J][0] to M_D[J][NFIELDS−1]. In response to the J-th bit vm[J] in the vector mask vm being the second value (e.g., logic 0), the load-store device 130 skips the reading of the vector register file 150 in the J-th iteration. In response to the J-th bit vm[J] in the vector mask vm being the second value, the memory write of the J-th iteration is skipped.

Please refer to FIG. 11. After the plurality of read operations are completed, the load-store device 130 rotates the data elements of different vector registers of the vector register file 150 in the second direction by different rotation amounts, so as to return the data elements to the original locations. For example, after the plurality of read operations are completed, the load-store device 130 rotates the contents of the vector register VS[N] of the vector register file 150 in the right direction by the rotation amount "EEW*N", wherein N is an integer from 0 to NFIELDS−1. Taking FIG. 11 as an example, when N is 3, the vector register VS[3] may be the vector register VR3 shown in FIG. 11. When N is 3, the load-store device 130 rotates the contents of the vector register VR3 (i.e., the vector register VS[3]) in the right direction by the rotation amount "EEW*3 bits (that is, three data elements)".

Figure 13:
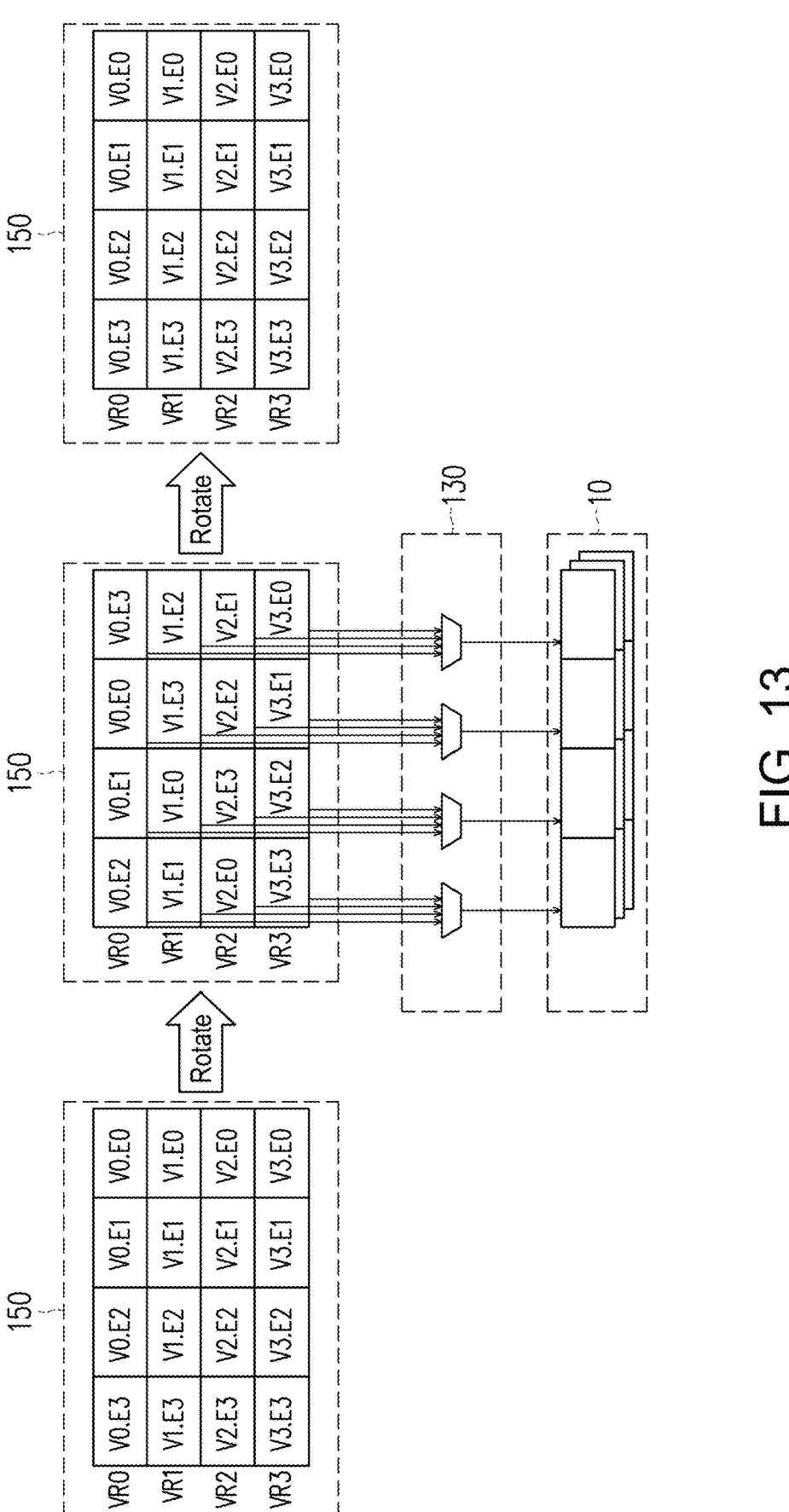
FIG. 13 is a schematic diagram of the operation of a load-store device performing multi-segment store on a memory shown according to another embodiment of the invention.

FIG. 13 is a schematic diagram of the operation of the load-store device 130 performing multi-segment store on the memory 10 shown according to another embodiment of the invention. For convenience of explanation, in the embodiment shown in FIG. 13, the vector length VL is assumed to be 4, and the number of fields NFIELDS in each segment is assumed to be 4. When the load-store device 130 performs multi-segment store on the memory 10, the load-store device 130 performs a first rotation on a plurality of data elements of different vector registers of the vector register file 150 in a first direction by different rotation amounts (for example, the rotation operation shown at the left side of the higher portion of FIG. 13).

For convenience of explanation, in the embodiment shown in FIG. 13, the vector register file 150 is assumed to have vector registers VR0, VR1, VR2, and VR3. Each vector register has four data elements. For example, as shown at the higher left side of FIG. 13, the vector register VR0 has data elements V0.E3, V0.E2, V0.E1, and V0.E0, the vector register VR1 has data elements V1.E3, V1.E2, V1.E1, and V1.E0, the vector register VR2 has data elements V2.E3, V2.E2, V2.E1, and V2.E0, and the vector register VR3 has data elements V3.E3, V3.E2, V3.E1, and V3.E0. The load-store device 130 performs the first rotation on the data elements of each of the vector registers VR0 to VR3 of the vector register file 150 in the right direction by different rotation amounts (the rotation results are shown in the higher center of FIG. 13).

Here, an example is used to illustrate the operating action of the first rotation performed on the vector registers VR0 to VR3. The load-store device 130 rotates the contents of one vector register VS[N] in the vector register file 150 in the right direction by the rotation amount "EEW*(NFIELDS−1−N)", wherein the EEW is the effective element width (unit: bits). Currently, the vector register may be represented by VS[N], and N is an integer from 0 to NFIELDS−1. Taking FIG. 13 as an example, when N is 0, the vector register VS[0] may be the vector register VR0 shown in FIG. 13. When N is 0, the load-store device 130 rotates the contents of the vector register VR0 (i.e., the vector register VS[0]) in the right direction by the rotation amount "EEW* (4-1-0) bits (that is, three data elements)". When N is 1, the load-store device 130 rotates the contents of the vector register VR1 (i.e., the vector register VS[1]) in the right direction by the rotation amount "EEW*(4-1-1) bits (that is, two data elements)".

After the first rotation is performed on the vector registers VR0 to VR3, the load-store device 130 may perform a plurality of read operations. In each read operation, the load-store device 130 may read data elements from different locations in different vector registers of the vector register file 150 within the same read cycle. For example, the load-store device 130 may perform VL store iterations to store the contents of different vector registers of the vector register file 150 to VL target segments of the memory 10. The number of fields in each of the VL target segments is NFIELDS fields, wherein NFIELDS is an integer greater than 1. The J-th iteration in the VL store iterations may read the data elements from the vector register file 150 within the same read cycle to be written in the same target segment of the memory 10, wherein J is an integer from 0 to VL−1. The following paragraph explains the operation of the J-th iteration.

Within the same read cycle, the load-store device 130 reads data elements from different locations in different vector registers of the vector register file 150. The vector register file 150 includes the N-th vector register VS[N], and the data element of the ((J+N−(NFIELDS−1)+ (VLEN/ EEW)) MOD (VLEN/EEW))-th element location in the N-th vector register VS[N] may be expressed as VS[N][(J+N− (NFIELDS−1)+(VLEN/EEW)) MOD (VLEN/EEW)], wherein N is an integer from 0 to NFIELDS−1. The load-store device 130 writes data elements of different locations in different vector registers of the vector register file 150 in the J-th target segment in the VL target segments of the memory 10 as a plurality of data elements M_D[J][0] to M_D[J][NFIELDS−1] of the J-th target segment, wherein M_D[J][0] is the data element of field 0 in the J-th target segment of the memory 10, and M_D[J][NFIELDS−1] is the data element of field NFIELDS−1 in the J-th target segment of the memory 10. The data element VS[N][(J+N− (NFIELDS−1)+(VLEN/EEW)) MOD (VLEN/EEW)] of the ((J+N−(NFIELDS−1)+(VLEN/EEW)) MOD (VLEN/ EEW))-th element location in the N-th vector register VS[N] is written in the J-th target segment of the memory 10 as the N-th data element M_D[J][N] in the data elements M_D[J] [0] to M_D[J][NFIELDS−1].

Figure 14A:
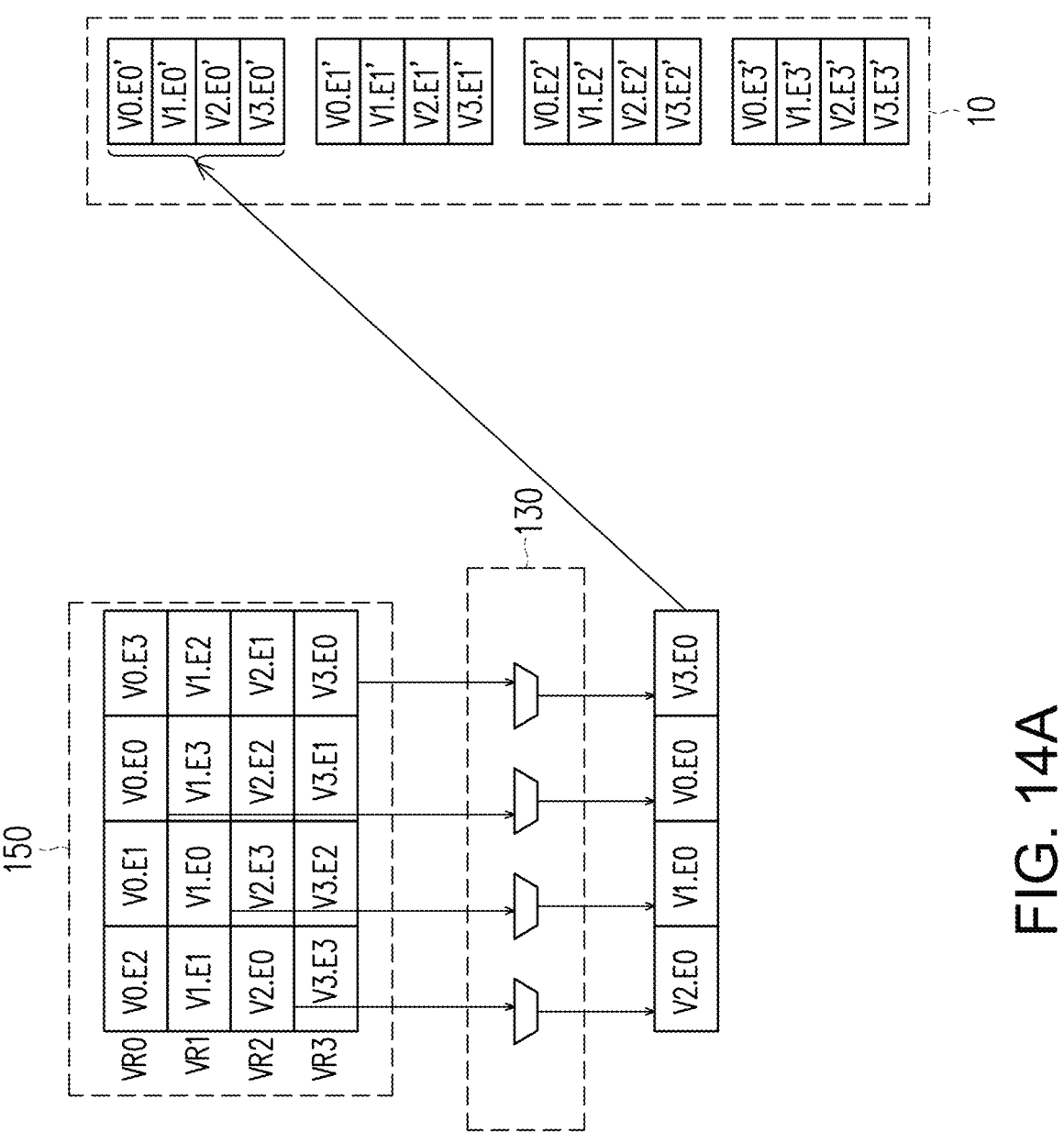
FIG. 14A to FIG. 14B are schematic diagrams of the process of storing the contents of a vector register file to a plurality of target segments of a memory shown according to an embodiment of the invention.
Figure 14B:
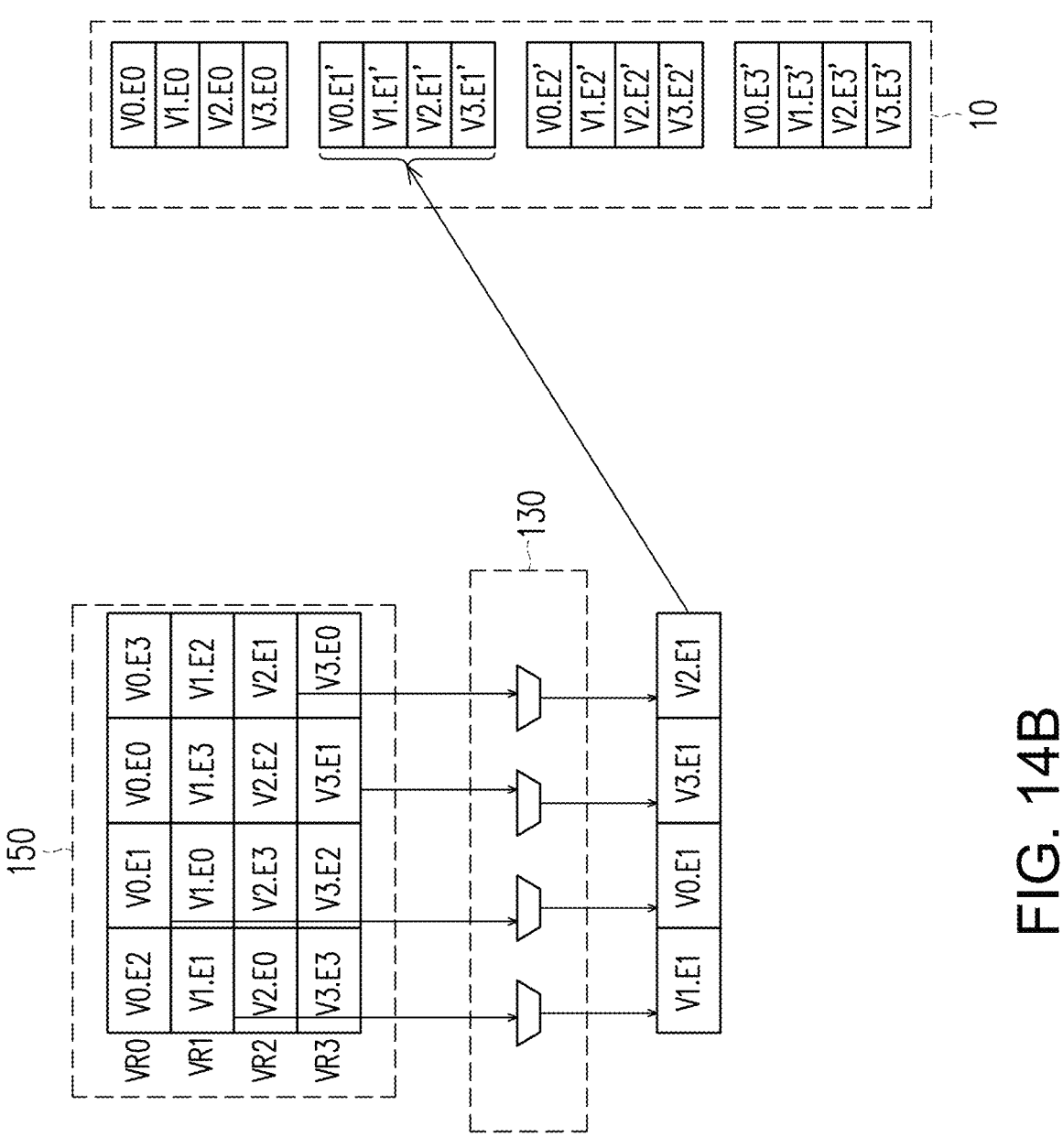

FIG. 14A to FIG. 14B are schematic diagrams of the process of storing the contents of the vector register file 150 to a plurality of target segments of the memory 10 shown according to an embodiment of the invention. For the vector register file 150 shown in FIG. 14A to FIG. 14B, reference may be made to the vector register file 150 shown in FIG. 13. In the embodiment shown in FIG. 14A to FIG. 14B, the vector length VL is assumed to be 4 (therefore, the memory 10 shown in FIG. 14A to FIG. 14B has 4 target segments), and the number of fields NFIELDS in each segment is assumed to be 4. In the operating scenario shown in FIG. 14A, the load-store device 130 may read a plurality of data elements V2.E0, V1.E0, V0.E0, and V3.E0 from different locations in different vector registers of the vector register file 150 within the same read cycle. The load-store device 130 writes the data elements V3.E0, V2.E0, V1.E0, and V0.E0 of the vector register file 150 in the zeroth target segment of the memory 10. In the operating scenario shown in FIG. 14B, the load-store device 130 may read a plurality of data elements V1.E1, V0.E1, V3.E1, and V2.E1 from different locations in different vector registers of the vector register file 150 within the same read cycle. The load-store device 130 writes the data elements V3.E1, V2.E1, V1.E1, and V0.E1 of the vector register file 150 in the first target segment of the memory 10. The second target segment and the third target segment of the memory 10 are as provided in the related descriptions of FIG. 14A to FIG. 14B and may be analogized as such, and therefore are not described again.

This paragraph illustrates that the VL load iterations performed by the load-store device 130 may also take into account the vector mask vm. Taking the vector mask vm into consideration, the operation of the J-th iteration of the multi-segment store includes the following. The load-store device 130 checks the vector mask vm. In response to the J-th bit vm[J] in the vector mask vm being the first value (e.g., logic 1), the load-store device 130 reads data elements from different locations in different vector registers of the vector register file 150 within the same read cycle. In response to the J-th bit vm[J] in the vector mask vm being the first value, the load-store device 130 writes data elements of different locations in different vector registers of the vector register file 150 in the J-th target segment in the VL target segments of the memory 10 as a plurality of data elements M_D[J][0] to M_D[J][NFIELDS−1] of the J-th target segment. For example, the data element VS[N][(J+ N−(NFIELDS−1)+(VLEN/EEW)) MOD (VLEN/EEW)] of the ((J+N−(NFIELDS−1)+(VLEN/EEW)) MOD (VLEN/ EEW))-th element location in the N-th vector register VS[N] of the vector register file 150 is written in the J-th target segment of the memory 10 as the N-th data element M_D [J][N] in the data elements M_D[J][0] to M_D[J] [NFIELDS−1], wherein N is an integer from 0 to NFIELDS−1. In response to the J-th bit vm[J] in the vector mask vm being the second value (e.g., logic 0), the load-store device 130 skips the reading of the vector register file 150 in the J-th iteration. In response to the J-th bit vm[J] in the vector mask vm being the second value, the memory write of the J-th iteration is skipped.

Please refer to FIG. 13. After the plurality of read operations are completed, the load-store device 130 rotates the data elements of the different vector registers of the vector register file 150 in the second direction by different rotation amounts, so as to return the data elements to the original locations. For example, after the plurality of read operations are completed, the load-store device 130 rotates the contents of the vector register VS[N] of the vector register file 150 in the left direction by the rotation amount "EEW*(NFIELDS–1–N)", wherein N is an integer from 0 to NFIELDS–1. Taking FIG. 13 as an example, when N is 3, the vector register VS[3] may be the vector register VR3 shown in FIG. 13. When N is 3, the load-store device 130 rotates the contents of the vector register VR3 (i.e., the vector register VS[3]) in the left direction by the rotation amount "EEW* (4-1-3) bits (that is, zero data elements)". When N is 2, the load-store device 130 rotates the contents of the vector register VR2 (i.e., the vector register VS[2]) in the left direction by the rotation amount "EEW*(4-1-2) bits (that is, one data element)".

Based on the above, the load-store device 130 may access a plurality of data elements of the same segment of the memory 10 within the same cycle. Generally, data elements of the same location in different vector registers are stored in the same segment of the memory as different field data. In some embodiments, the load-store device rotates different vector registers of the vector register file in units of data elements by different rotation amounts. After the rotation, the load-store device 130 may write a plurality of data elements from the same segment of the memory 10 in different locations in different vector registers of the vector register file 150 within the same write cycle, or reads data elements of different locations in different vector registers of the vector register file 150 and then stores in the same segment of the memory 10 within the same read cycle. Therefore, the load-store device 130 may load a plurality of vectors from the memory 10 to the vector register file 150 and (or) store a plurality of vectors from the vector register file 150 to the memory 10.

Figure 15:
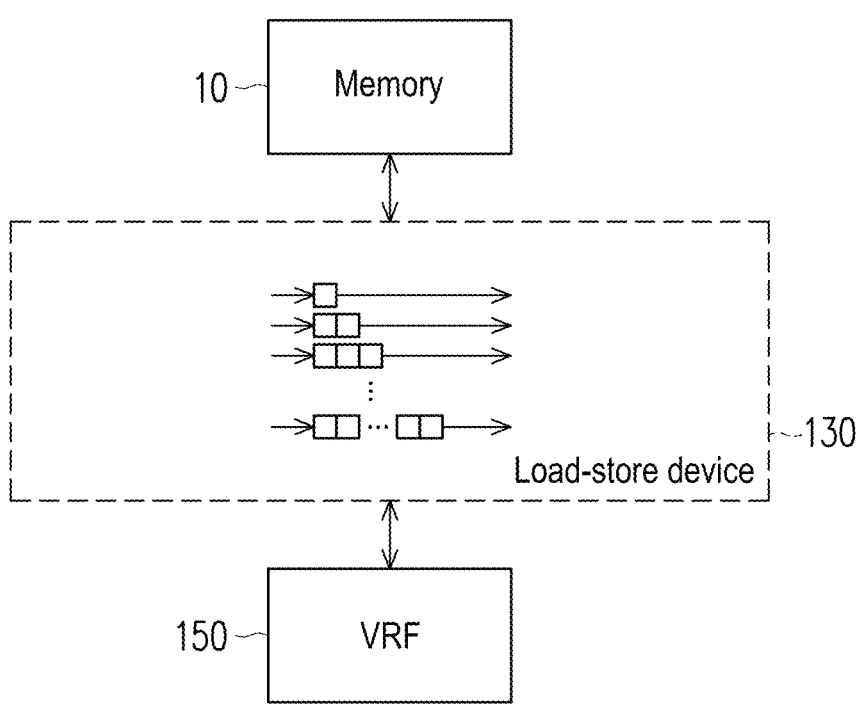
FIG. 15 is a schematic circuit block diagram of a load-store device according to another embodiment of the invention.

FIG. 15 is a schematic circuit block diagram of a load-store device 130 according to another embodiment of the invention. The load-store device 130 shown in FIG. 15 may be used as one of many implementation examples of the load-store device 130 shown in FIG. 1 (or the DMA controller 170 shown in FIG. 2). For the memory 10, the load-store device 130, and the vector register file 150 shown in FIG. 15, please refer to the related descriptions of the memory 10, the load-store device 130, and the vector register file 150 shown in FIG. 1, and for the load-store device 130 shown in FIG. 3, please refer to the related description of the load-store device 130 shown in FIG. 3, and therefore no further description is given here.

In the embodiment shown in FIG. 15, the load-store device 130 includes a plurality of register pipelines. Each register pipeline includes at least one register stage (each small square in the load-store device 130 shown in FIG. 15 represents one register stage). The numbers of stages of the register pipelines in the load-store device 130 are different from each other. Each register pipeline of the load-store device 130 may transfer data elements of each stage to the next stage. When the load-store device 130 performs multi-segment load on the memory 10, the input terminals (first stages) of the register pipelines in the load-store device 130 are used to receive a plurality of data elements from the same source segment of the memory 10 within the same load cycle. Since the numbers of stages of the register pipelines are different from each other, the output terminals (final stages) of the register pipelines output a plurality of data elements from different source segments of the memory 10 to different locations in different vector registers of the vector register file 150 within the same write cycle.

When the load-store device 130 performs multi-segment load on the memory 10, the load-store device 130 performs VL load iterations to load the contents of the VL source segments of the memory 10 into the register pipelines of the load-store device 130 and writes the overflow contents of the register pipelines in the vector register file 150, wherein VL is the vector length (unit is the number of elements). For example, the x-th iteration in the VL load iterations may load a plurality of data elements of the x-th source segment in the VL source segments of the memory 10 to the input terminals of the register pipelines (first register stages), wherein x is an integer from 0 to VL–1. The following paragraph explains the operation of the x-th iteration.

The load-store device 130 reads a plurality of data elements M_D[x][0] to M_D[x][NFIELDS–1] from the x-th source segment in the VL source segments of the memory 10, wherein M_D[x][0] represents the data element of field 0 in the x-th source segment of the memory 10, and M_D[x][NFIELDS–1] represents the data element of field NFIELDS–1 in the x-th source segment of the memory 10. The load-store device 130 loads the data elements M_D[x][0] to M_D[x][NFIELDS–1] into the first stages of the register pipelines. In the same register pipeline, before new data is loaded in the first stage, the original content of the first stage is transferred to the second stage, and the original content of the second stage is transferred to the third stage (and so on for the other stages). Within the same write cycle, the load-store device 130 writes all valid data elements of the final stages of the register pipelines in different locations in different vector registers of the vector register file 150.

Taking the vector mask vm into consideration, the operation of the x-th iteration includes the following. The load-store device 130 checks the vector mask vm. In response to the x-th bit vm[x] in the vector mask vm being the first value (e.g., logic 1), the load-store device 130 reads a plurality of data elements M_D[x][0] to M_D[x][NFIELDS–1] from the x-th source segment in the VL source segments of the memory 10. The load-store device 130 loads the data elements M_D[x][0] to M_D[x][NFIELDS–1] into the first stages of the register pipelines. In response to the x-th bit vm[x] in the vector mask vm being the second value (e.g., logic 0), the load-store device 130 skips the reading of the x-th source segment of the memory 10 in the x-th iteration. In response to the x-th bit vm[x] in the vector mask vm being the second value, the first stages of the register pipelines are set to invalid. Invalid elements are not written in the vector register file 150.

After the VL load iteration, the load-store device 130 performs NFIELDS–1 write iterations to write the remaining contents of the register pipelines in the vector register file 150. The y-th iteration in the NFIELDS–1 write iterations includes: within the same write cycle, the load-store device 130 writes all valid data elements of the final stages of the register pipelines in different locations in different vector registers of the vector register file 150. The process of loading the contents of a plurality of source segments of the memory 10 in the vector register file 150 is described below with reference to FIG. 16A to FIG. 16G.

FIG. 16A to FIG. 16G are schematic diagrams of the operation of the load-store device 130 performing multi-segment load on the memory 10 shown according to an embodiment of the invention. For the memory 10, the load-store device 130, and the vector register file 150 shown in FIG. 16A to FIG. 16G, please refer to the related description of the memory 10, the load-store device 130, and the vector register file 150 shown in FIG. 15. For convenience of explanation, in the embodiment shown in FIG.

Figure 16A:
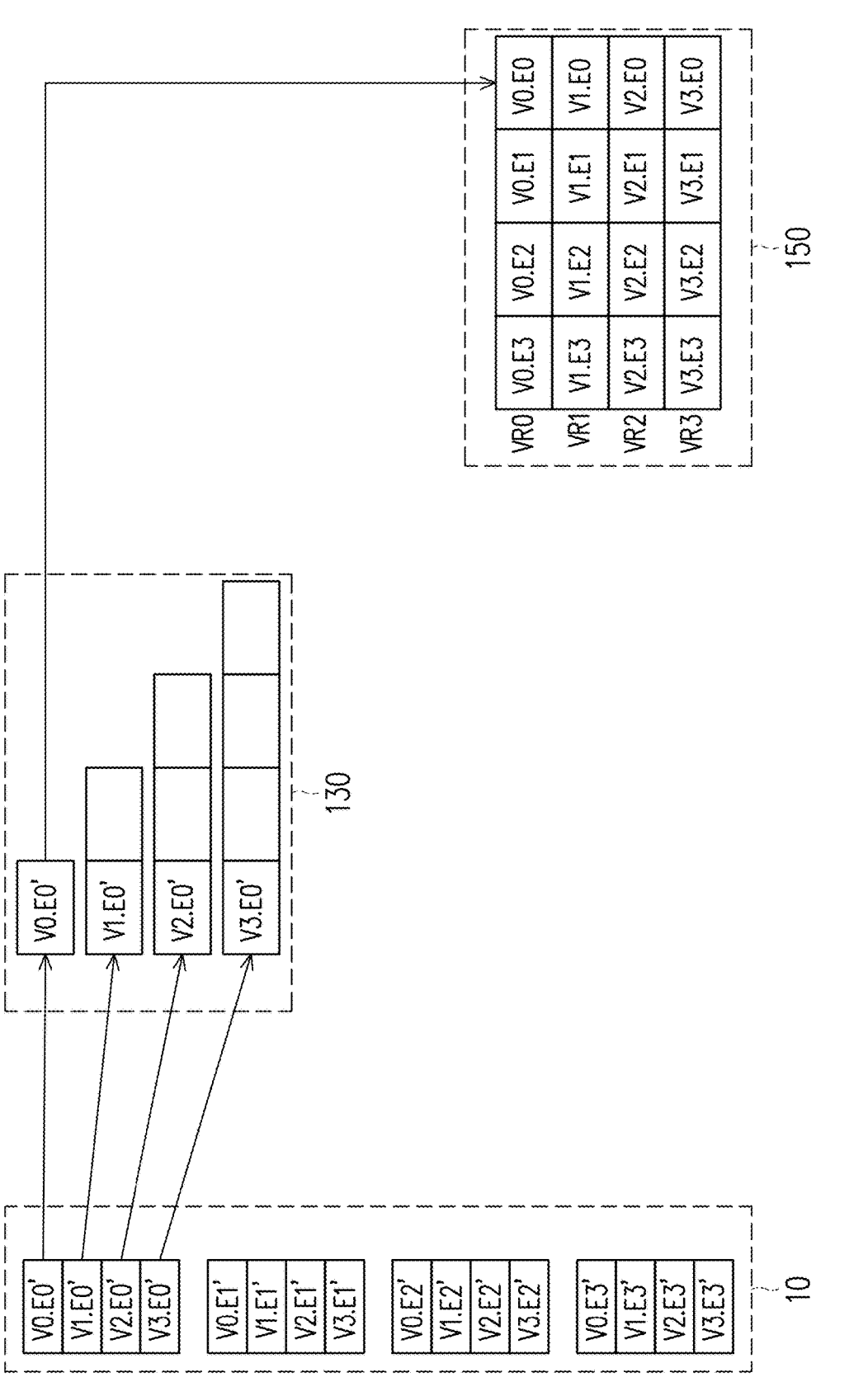
FIG. 16A to FIG. 16G are schematic diagrams of the operation of a load-store device performing multi-segment load on a memory shown according to an embodiment of the invention.
Figure 16B:
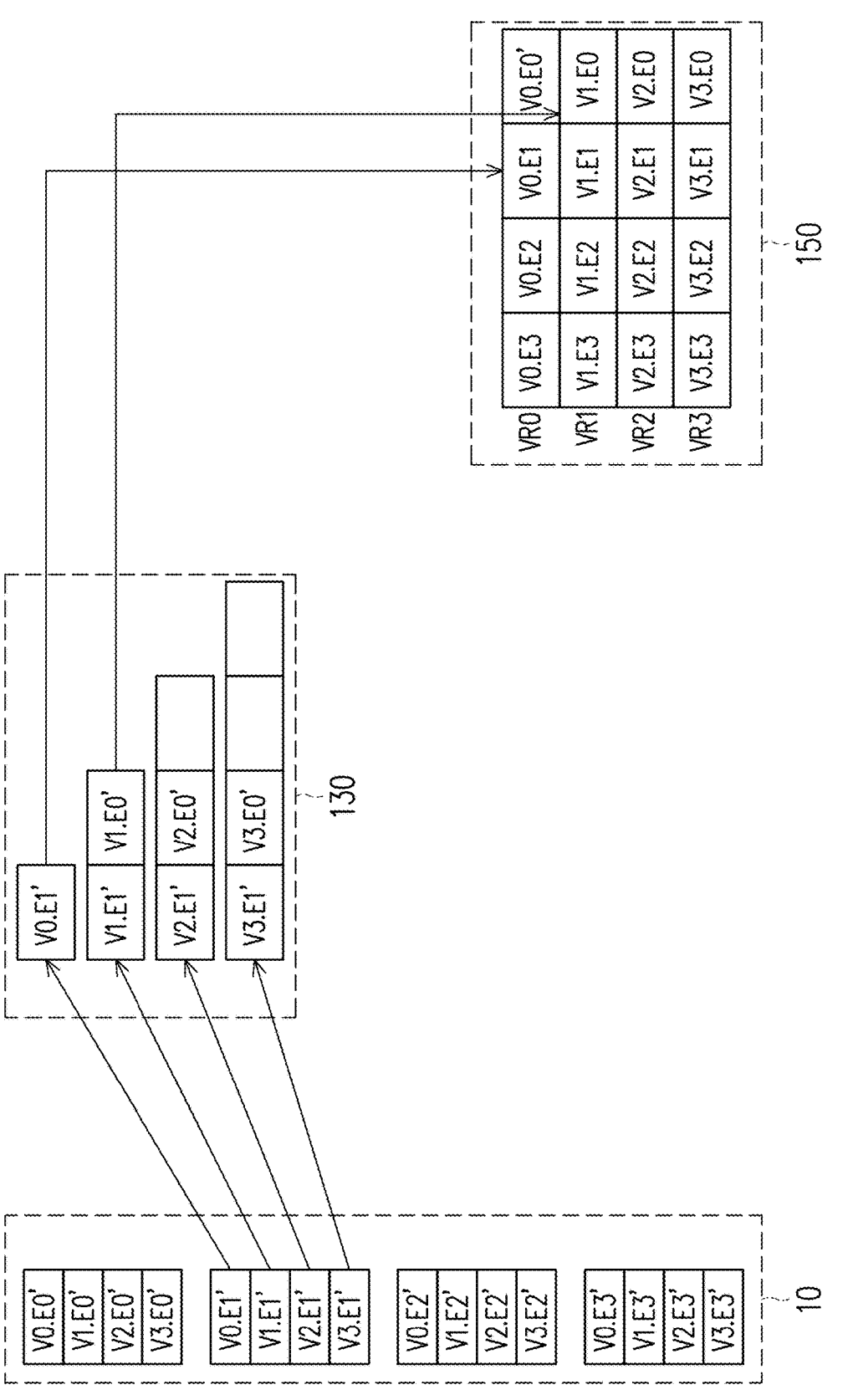
Figure 16C:
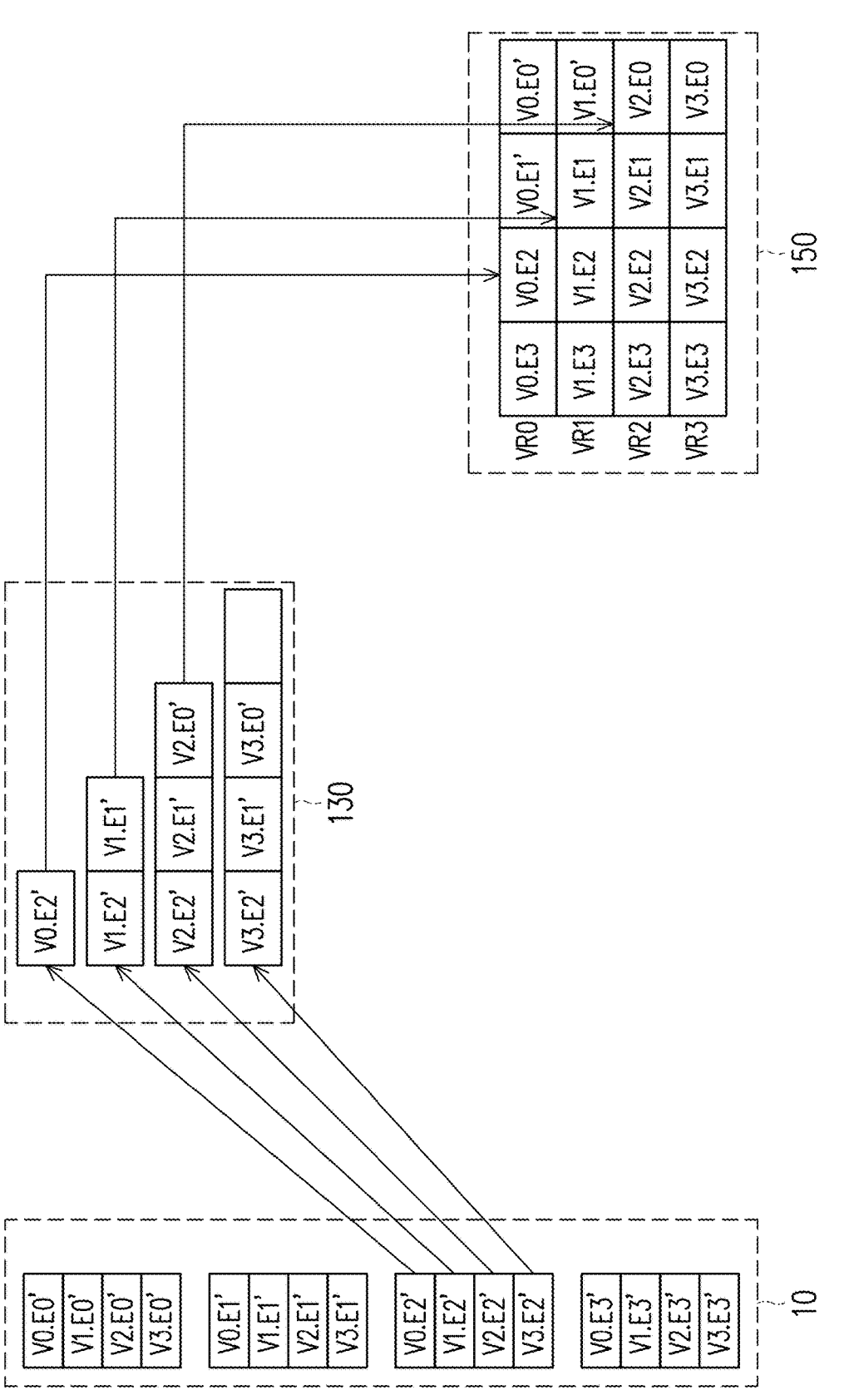
Figure 16D:
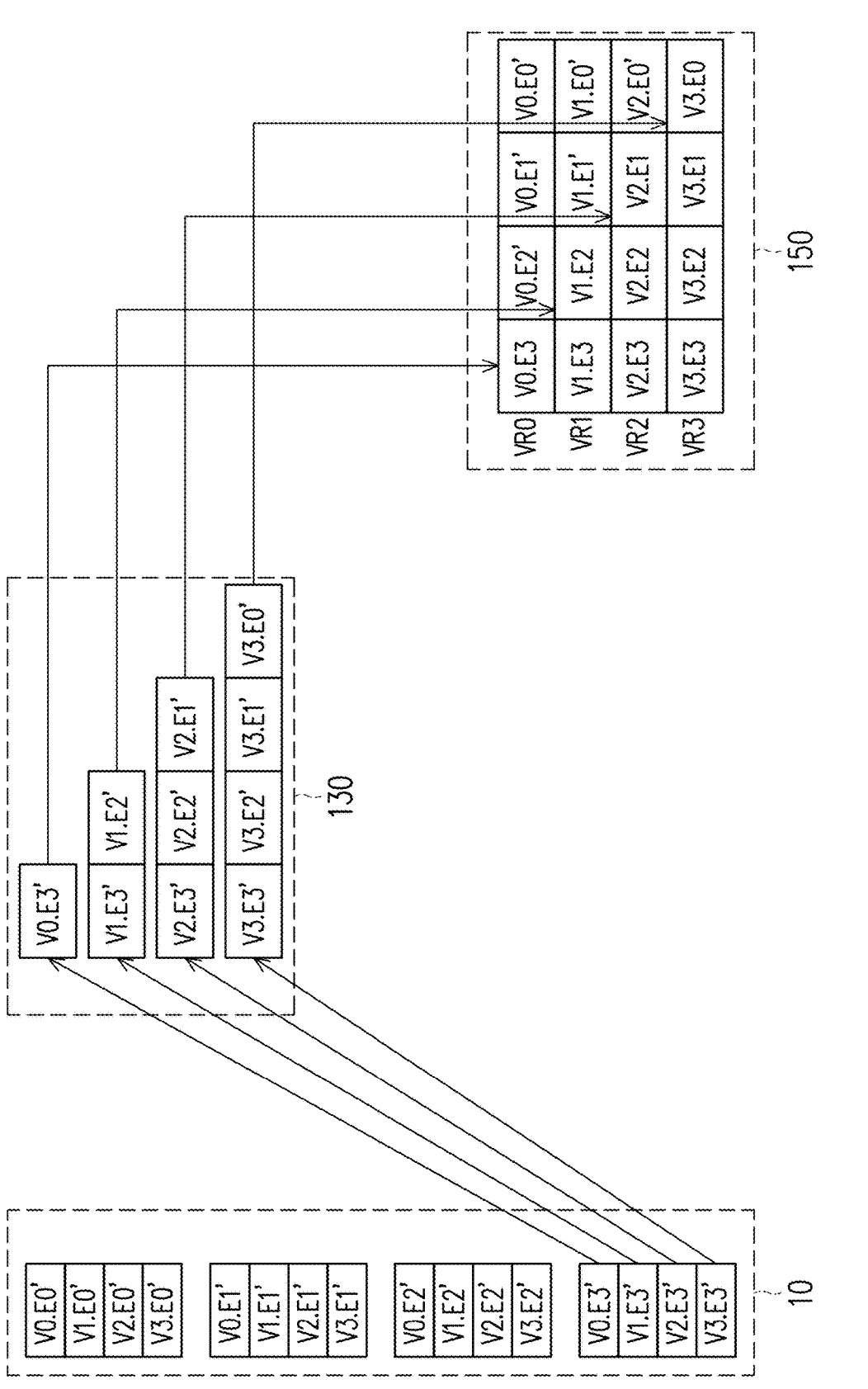
Figure 16E:
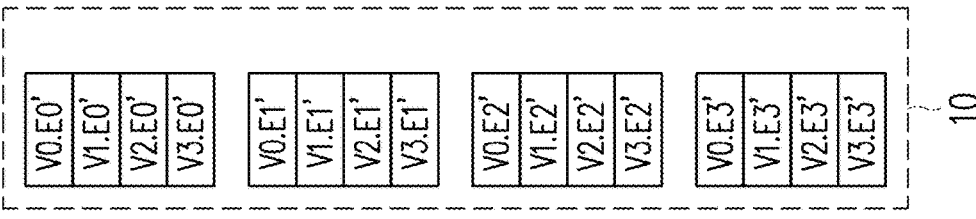
Figure 16F:
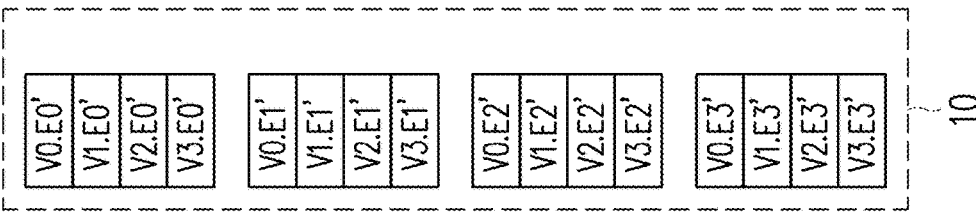
Figure 16G:
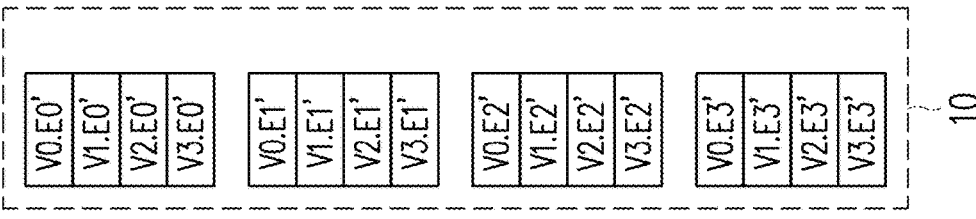

16A to FIG. 16G, the vector length VL is assumed to be 4 (therefore, the memory 10 shown in FIG. 16A to FIG. 16G has 4 source segments), the number of fields NFIELDS in each segment is assumed to be 4, and the vector register file 150 is assumed to have vector registers VR0, VR1, VR2, and VR3. Based on the vector register length VLEN and the effective element width EEW, each vector register has VLEN/EEW data elements. For example (but not limited to), each vector register has four data elements. Based on the actual hardware design, it is assumed here that the load-store device 130 shown in FIG. 16A to FIG. 16G includes (but is not limited to) 4 register pipelines. Each small block in the load-store device 130 shown in FIG. 16A to FIG. 16G represents one register stage in the register pipeline. It should be noted that the number of register pipelines in the load-store device 130 may be determined according to the actual design. When the load-store device 130 performs multi-segment load on the memory 10, the load-store device 130 performs four load iterations as shown in FIG. 16A to FIG. 16D to load the contents of the VL source segments of the memory 10 into the register pipelines (the contents of the final stages of the register pipelines are written in the vector register file 150), and then performs the three write iterations shown in FIG. 16E to FIG. 16G to write the remaining contents of the register pipelines in the vector register file 150.

FIG. 16A illustrates the zeroth iteration (x=0) in the VL load iterations. In the operating scenario shown in FIG. 16A, the load-store device 130 reads a plurality of field data M_D[0][0] to M_D[0][4-1] from the zeroth source segment in the VL source segments of the memory 10 within the same load cycle, for example, the data elements V3.E0', V2.E0', V1.E0', and V0.E0' shown in FIG. 16A. The load-store device 130 loads the data elements V3.E0' to V0.E0' into the first stages of the register pipelines in the load-store device 130 (as shown in FIG. 16A). Next, the load-store device 130 writes the valid data element V0.E0' of the final stages of the register pipelines in the zeroth location in the vector register VR0 of the vector register file 150 within the same write cycle. Therefore, the data element "V0.E0" in the vector register VR0 is updated to "V0.E0'" (as shown in FIG. 16B).

FIG. 16B illustrates the first iteration (x=1) in the VL load iterations. Each register pipeline of the load-store device 130 transfers data elements of each stage to the next stage. In the operating scenario shown in FIG. 16B, the load-store device 130 reads a plurality of field data M_D[1][0] to M_D[1][4-1] from the first source segment in the VL source segments of the memory 10 within the same load cycle, for example, the data elements V3.E1', V2.E1', V1.E1', and V0.E1' shown in FIG. 16B. The load-store device 130 loads the data elements V3.E1' to V0.E1' into the first stages of the register pipelines in the load-store device 130 (as shown in FIG. 16B). Next, within the same write cycle, the load-store device 130 writes the valid data elements V0.E1' and V1.E0' of the final stages of the register pipelines respectively in the first location in the vector register VR0 and the zeroth location in the vector register VR1 of the vector register file 150. Therefore, the data element "V0.E1" in the vector register VR0 is updated to "V0.E1'", and the data element "V1.E0" in the vector register VR1 is updated to "V1.E0'" (as shown in FIG. 16C).

FIG. 16C illustrates the second iteration (x=2) in the VL load iterations. Each register pipeline of the load-store device 130 continues to transfer data elements of each stage to the next stage. In the operating scenario shown in FIG. 16C, the load-store device 130 reads a plurality of field data M_D[2][0] to M_D[2][4-1] from the second source segment in the VL source segments of the memory 10 within the same load cycle, for example, the data elements V3.E2', V2.E2, V1.E2', and V0.E2' shown in FIG. 16C. The load-store device 130 loads the data elements V3.E2' to V0.E2' into the first stages of the register pipelines in the load-store device 130 (as shown in FIG. 16C). Next, within the same write cycle, the load-store device 130 writes the valid data elements V0.E2', V1.E1', and V2.E0' of the final stages of the register pipelines respectively in the second location in the vector register VR0, the first location in the vector register VR1, and the zeroth location in the vector register VR2 of the vector register file 150. Therefore, the data element "V0.E2" in the vector register VR0 is updated to "V0.E2'", the data element "V1.E1" in the vector register VR1 is updated to "V1.E1'", and the data element "V2.E0" in the vector register VR2 is updated to "V2.E0'" (as shown in FIG. 16D).

FIG. 16D illustrates the third iteration (x=3) in the VL load iterations. Each register pipeline of the load-store device 130 continues to transfer data elements of each stage to the next stage. In the operating scenario shown in FIG. 16D, the load-store device 130 reads a plurality of field data M_D[3][0] to M_D[3][4-1] from the third source segment in the VL source segments of the memory 10 within the same load cycle, for example, the data elements V3.E3', V2.E3', V1.E3', and V0.E3' shown in FIG. 16D. The load-store device 130 loads the data elements V3.E3' to V0.E3' into the first stages of the register pipelines in the load-store device 130 (as shown in FIG. 16D). Next, within the same write cycle, the load-store device 130 writes the valid data elements V0.E3', V1.E2', V2.E1', and V3.E0' of the final stages of the register pipelines respectively in the third location in the vector register VR0, the second location in the vector register VR1, the first location in the vector register VR2, and the zeroth location in the vector register VR3 of the vector register file 150. Therefore, the data element "V0.E3" in the vector register VR0 is updated to "V0.E3'", the data element "V1.E2" in the vector register VR1 is updated to "V1.E2'", the data element "V2.E1" in the vector register VR2 is updated to "V2.E1'", and the data element "V3.E0" in the vector register VR3 is updated to "V3.E0'" (as shown in FIG. 16E).

FIG. 16E illustrates the zeroth write iteration (y=0) in the NFIELDS−1 write iterations. Each register pipeline of the load-store device 130 continues to transfer data elements of each stage to the next stage. In the operating scenario shown in FIG. 16E, the load-store device 130 writes the valid data elements V1.E3', V2.E2', and V3.E1' of the final stages of the register pipelines respectively within the same write cycle in the third location in the vector register VR1, the second location in the vector register VR2, and the first location in the vector register VR3 of the vector register file 150. Therefore, the data element "V1.E3" in the vector register VR1 is updated to "V1.E3'", the data element "V2.E2" in the vector register VR2 is updated to "V2.E2'", and the data element "V3.E1" in the vector register VR3 is updated to "V3.E1'" (as shown in FIG. 16F).

FIG. 16F illustrates the first write iteration (y=1) in the NFIELDS−1 write iterations. Each register pipeline of the load-store device 130 continues to transfer data elements of each stage to the next stage. In the operating scenario shown in FIG. 16F, the load-store device 130 writes the valid data elements V2.E3' and V3.E2' of the final stages of the register pipelines respectively within the same write cycle in the third location in the vector register VR2 and the second location in the vector register VR3 of the vector register file

150. Therefore, the data element "V2.E3" in the vector register VR2 is updated to "V2.E3'", and the data element "V3.E2" in the vector register VR3 is updated to "V3.E2'" (as shown in FIG. 16G).

FIG. 16G illustrates the second write iteration (y=2) in the NFIELDS−1 write iterations. Each register pipeline of the load-store device 130 continues to transfer data elements of each stage to the next stage. In the operating scenario shown in FIG. 16G, the load-store device 130 writes the valid data element V3.E3' of the final stages of the register pipelines within the same write cycle in the third location in the vector register VR3 of the vector register file 150. Therefore, the data element "V3.E3" in the vector register VR3 is updated to "V3.E3'".

Please refer to FIG. 15. When the load-store device 130 performs multi-segment store on the memory 10, the input terminals of the register pipelines in the load-store device 130 are used to receive a plurality of data elements from different locations in different vector registers of the vector register file 150 within the same read cycle. Since the numbers of stages of the register pipelines are different from each other, the output terminals of the register pipelines output a plurality of data elements from the same location in different vector registers of the vector register file 150 to the same target segment of the memory 10 within the same store cycle.

When the load-store device 130 performs multi-segment store on the memory 10, the load-store device 130 performs NFIELDS−1 read iterations, so as to read the first portion of the data elements of the vector register file 150 into the register pipelines of the load-store device 130, wherein NFIELDS is the number of fields of each target segment of the VL target segments of the memory, and VL is the vector length. For example, the zeroth iteration in the NFIELDS−1 read iterations includes: storing the data element of the zeroth location in the (NFIELDS−1)-th vector register of the vector register file 150 to the first stage of the (NFIELDS−1)-th register pipeline of the register pipelines of the load-store device 130. The first iteration in the NFIELDS−1 read iterations includes: within the same read cycle, storing the data element of the first location in the (NFIELDS−1)-th vector register of the vector register file 150 to the first stage of the (NFIELDS-1)-th register pipeline of the register pipelines of the load-store device 130, and storing the data element of the zeroth location in the (NFIELDS−2)-th vector register of the vector register file 150 to the first stage of the (NFIELDS−2)-th register pipeline of the register pipelines of the load-store device 130. In the same register pipeline, before new data is stored in the first stage, the original content of the first stage is transferred to the second stage, and the original content of the second stage is transferred to the third stage (and so on for the other stages).

After the NFIELDS−1 read iterations, the load-store device 130 performs VL store iterations to write the remaining contents of the vector register file 150 in the register pipelines of the load-store device 130, and the outputs of the register pipelines of the load-store device 130 are stored in the VL target segments of the memory 10. The x-th iteration in the VL store iterations includes: the load-store device 130 reads a plurality of data elements of different locations in different vector registers of the vector register file 150 and stores them to the first stages of the register pipelines within the same read cycle, and the load-store device 130 stores the outputs of the register pipelines into the x-th target segment in the VL target segments of the memory 10. For example, the load-store device 130 writes all valid data elements of the final stages of the register pipelines in the x-th target segment in the VL target segments of the memory 10.

Taking the vector mask vm into consideration, the load-store device 130 checks the vector mask vm. In response to the x-th bit vm[x] in the vector mask vm being the first value (e.g., logic 1), the load-store device 130 reads a plurality of data elements of different locations in different vector registers of the vector register file 150 and stores them to the first stages of the register pipelines within the same read cycle, and the load-store device 130 writes all valid data elements of the final stages of the register pipelines in the x-th target segment in the VL target segments of the memory 10. In response to the x-th bit vm[x] in the vector mask vm being the second value, the memory write of the x-th target segment of the x-th iteration is skipped.

Figure 17A:
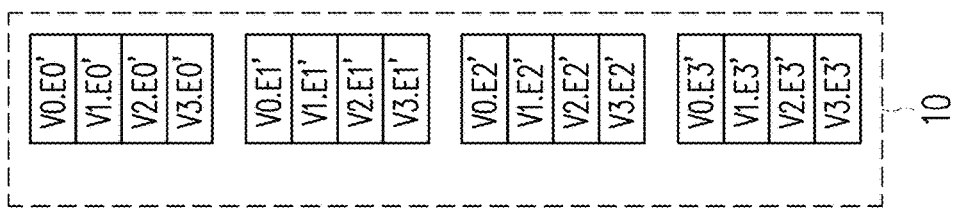
FIG. 17A to FIG. 17G are schematic diagrams of the operation of a load-store device performing multi-segment store on a memory shown according to an embodiment of the invention.
Figure 17A:
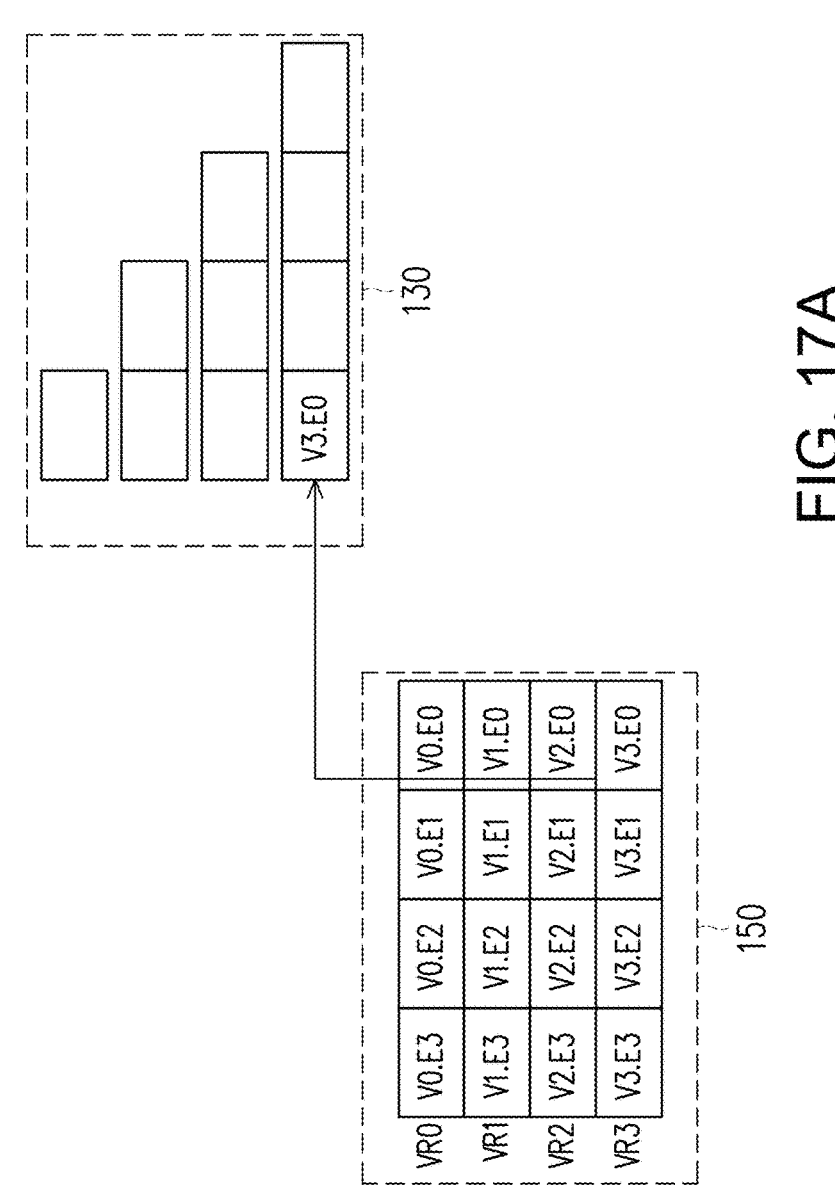
Figure 17B:
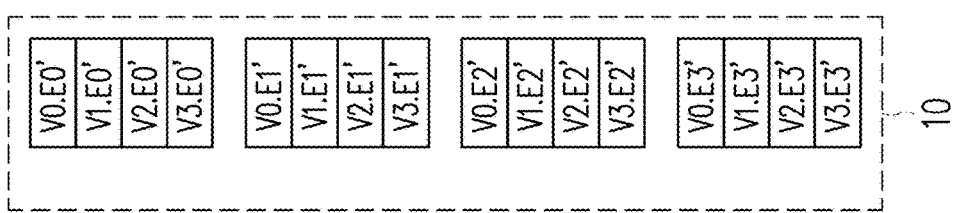
Figure 17B:
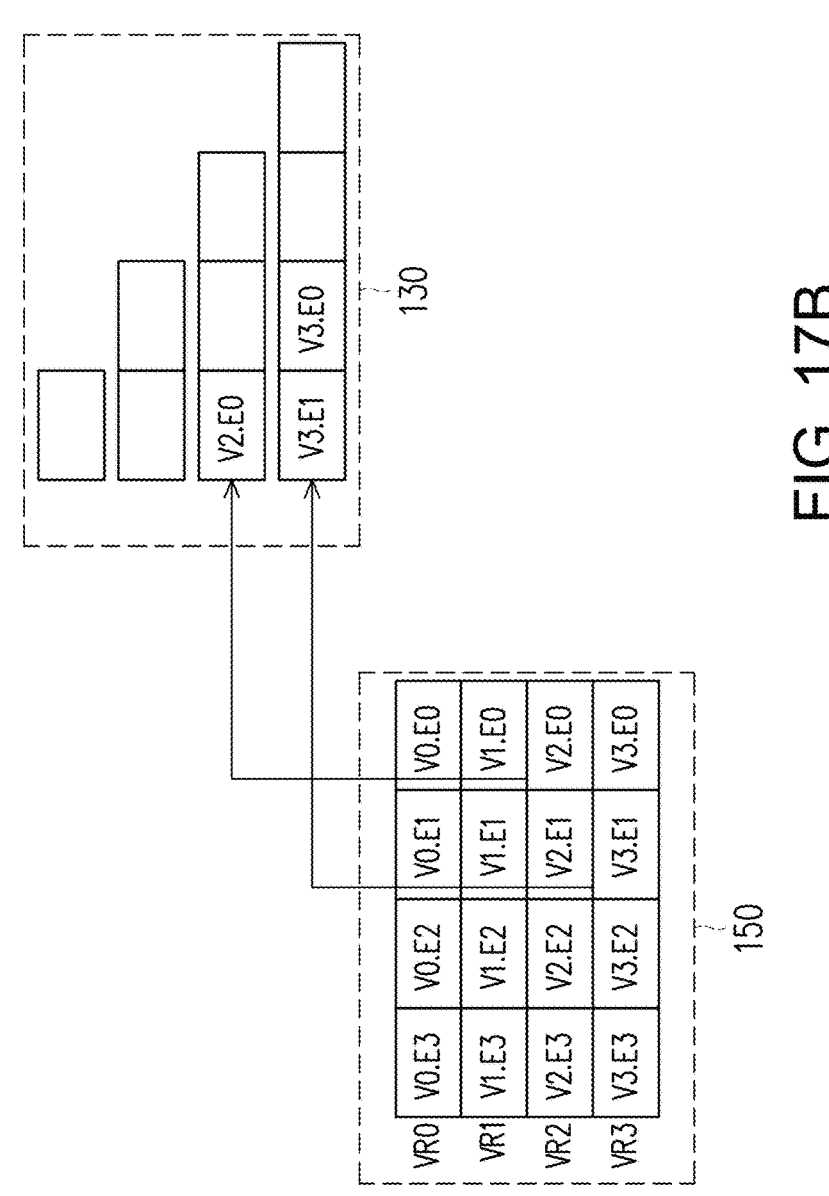
Figure 17C:
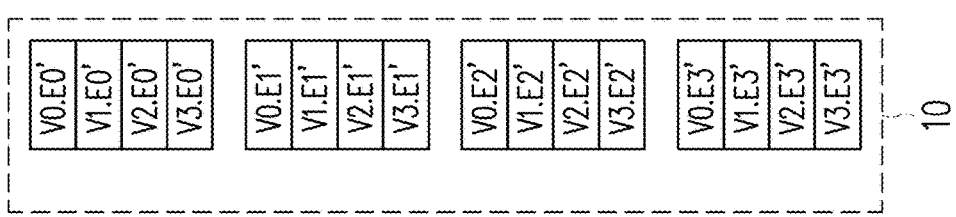
Figure 17C:
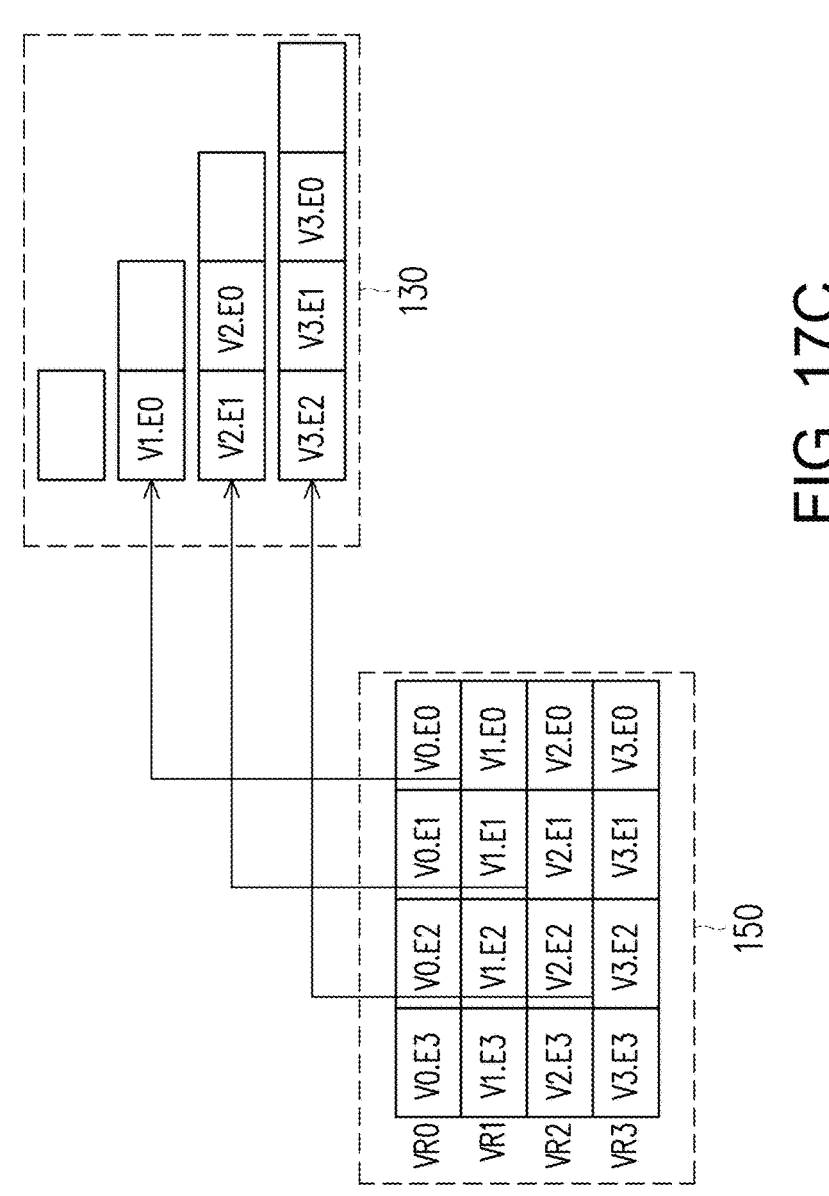

FIG. 17A to FIG. 17G are schematic diagrams of the operation of a load-store device 130 performing multi-segment store on the memory 10 shown according to an embodiment of the invention. For the memory 10, the load-store device 130, and the vector register file 150 shown in FIG. 17A to FIG. 17G, please refer to the related description of the memory 10, the load-store device 130, and the vector register file 150 shown in FIG. 15. For convenience of explanation, in the embodiment shown in FIG. 17A to FIG. 17G, the vector length VL is assumed to be 4 (therefore, the memory 10 shown in FIG. 17A to FIG. 17G has 4 target segments), the number of fields NFIELDS in each segment is assumed to be 4, and the vector register file 150 is assumed to have vector registers VR0, VR1, VR2, and VR3 (each vector register has four data elements). The load-store device 130 shown in FIG. 17A to FIG. 17G includes four register pipelines. Each small block in the load-store device 130 shown in FIG. 17A to FIG. 17G represents one register stage in the register pipeline. It should be noted that the number of register pipelines in the load-store device 130 may be determined according to the actual design. When the load-store device 130 performs multi-segment store on the memory 10, the load-store device 130 performs three read iterations as shown in FIG. 17A to FIG. 17C to read the first portion of the data elements of the vector register file 150 to the register pipelines of the load-store device 130. After three read iterations shown in FIG. 17A to FIG. 17C, the load-store device 130 performs the four store iterations shown in FIG. 17D to FIG. 17G to read the remaining contents of the vector register file 150 to the register pipelines of the load-store device 130, and the outputs of the register pipelines of the load-store device 130 are stored in the VL target segments of the memory 10.

FIG. 17A illustrates the zeroth read iteration in the NFIELDS−1 read iterations. In the operating scenario shown in FIG. 17A, the load-store device 130 reads the data element V3.E0 of location 0 in the third vector register VR3 ((NFIELDS−1)-th vector register) of the vector register file 150 to the first stage of the third register pipeline ((NFIELDS−1)-th register pipeline) of the register pipelines of the load-store device 130 (as shown in FIG. 17A).

FIG. 17B illustrates the first read iteration in the NFIELDS−1 read iterations. Each register pipeline of the load-store device 130 transfers data elements of each stage to the next stage. In the operating scenario shown in FIG. 17B, the load-store device 130 reads the data element V3.E1 of the first location in the vector register VR3 of the vector register file 150 to the first stage of the third register pipeline of the register pipelines of the load-store device 130 and reads the data element V2.E0 of the zeroth location in the vector register VR2 ((NFIELDS−2)-th vector register) of the vector register file 150 and stores them to the first stage of the second register pipeline ((NFIELDS−2)-th register pipeline) of the register pipelines of the load-store device 130 within the same read cycle (as shown in FIG. 17B).

FIG. 17C illustrates the second read iteration in the NFIELDS−1 read iterations. Each register pipeline of the load-store device 130 continues to transfer data elements of each stage to the next stage. In the operating scenario shown in FIG. 17C, the load-store device 130 reads the data element V3.E2 of the second location in the vector register VR3 of the vector register file 150 and stores them to the first stage of the third register pipeline of the register pipelines of the load-store device 130, reads the data element V2.E1 of the first location in the vector register VR2 of the vector register file 150 and stores them to the first stage of the second register pipeline of the register pipelines of the load-store device 130, and reads the data element V1.E0 of the zeroth location in the vector register VR1 ((NFIELDS−3)-th vector register) of the vector register file 150 and stores them to the first stage of the first register pipeline ((NFIELDS−3)-th register pipeline) of the register pipelines of the load-store device 130 within the same read cycle (as shown in FIG. 17C).

Figure 17D:
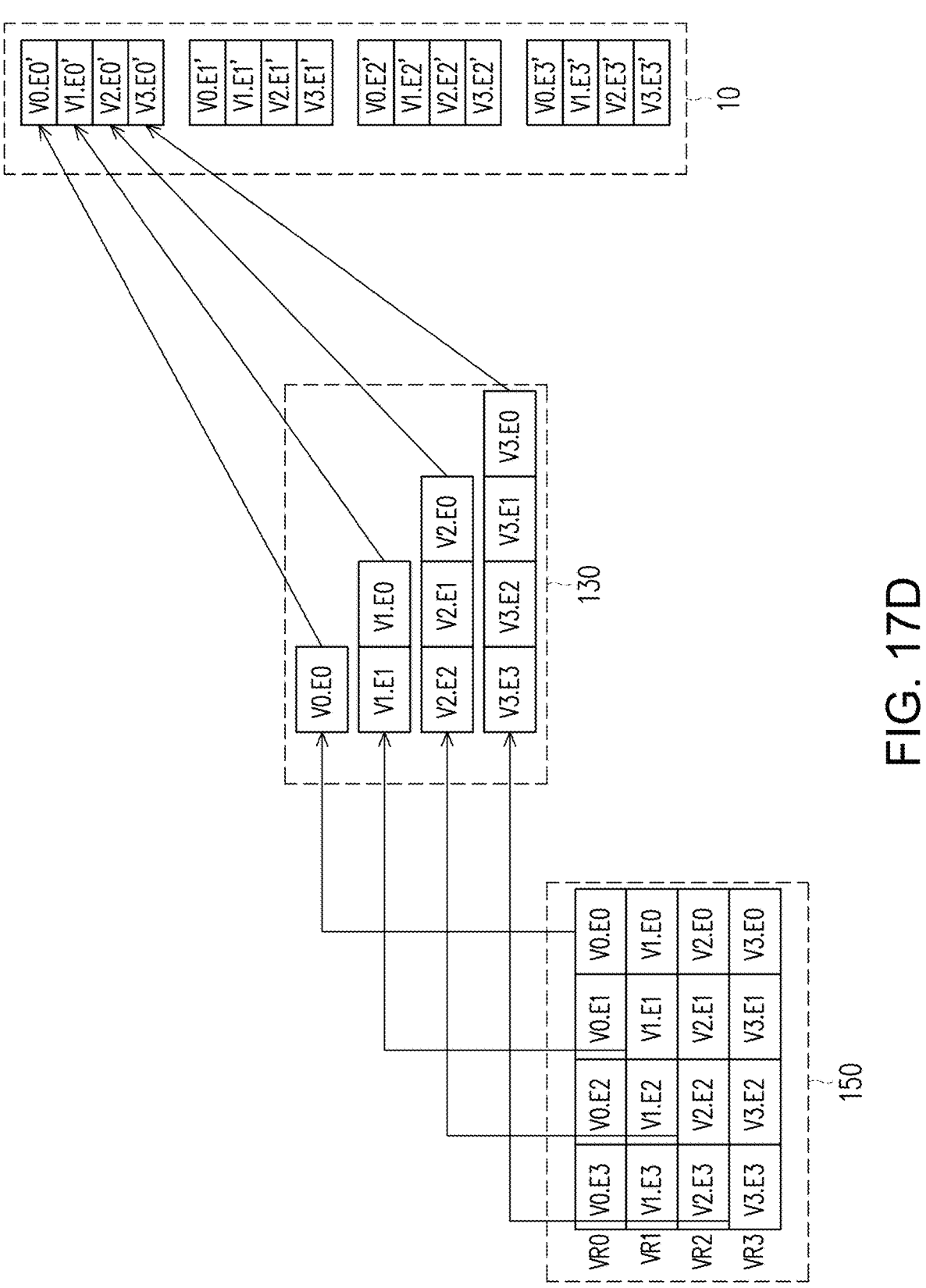

FIG. 17D illustrates the zeroth iteration (x=0) in the VL store iterations. Each register pipeline of the load-store device 130 continues to transfer data elements of each stage to the next stage. In the operating scenario shown in FIG. 17D, the load-store device 130 reads the data element V3.E3 of the third location in the vector register VR3 of the vector register file 150 and stores them to the first stage of the third register pipeline of the register pipelines of the load-store device 130, reads the data element V2.E2 of the second location in the vector register VR2 of the vector register file 150 and stores them to the first stage of the second register pipeline of the register pipelines of the load-store device 130, reads the data element V1.E1 of the first location in the vector register VR1 of the vector register file 150 and stores them to the first stage of the first register pipeline of the register pipelines of the load-store device 130, and reads the data element V0.E0 of the zeroth location in the vector register VR0 ((NFIELDS−4)-th vector register) of the vector register file 150 and stores them to the first stage of the zeroth register pipeline ((NFIELDS−4)-th register pipeline) of the register pipelines of the load-store device 130 within the same read cycle (as shown in FIG. 17D). Next, the load-store device 130 writes the valid data elements V3.E0, V2.E0, V1.E0, and V0.E0 of the final stages of the register pipelines in the zeroth target segment in the VL target segments of the memory 10 within the same store cycle. Therefore, the data elements "V3.E0', V2.E0', V1.E0', and V0.E0'" in the zeroth target segment of the memory 10 are updated to "V3.E0, V2.E0, V1.E0, and V0.E0" (as shown in FIG. 17E).

Figure 17E:
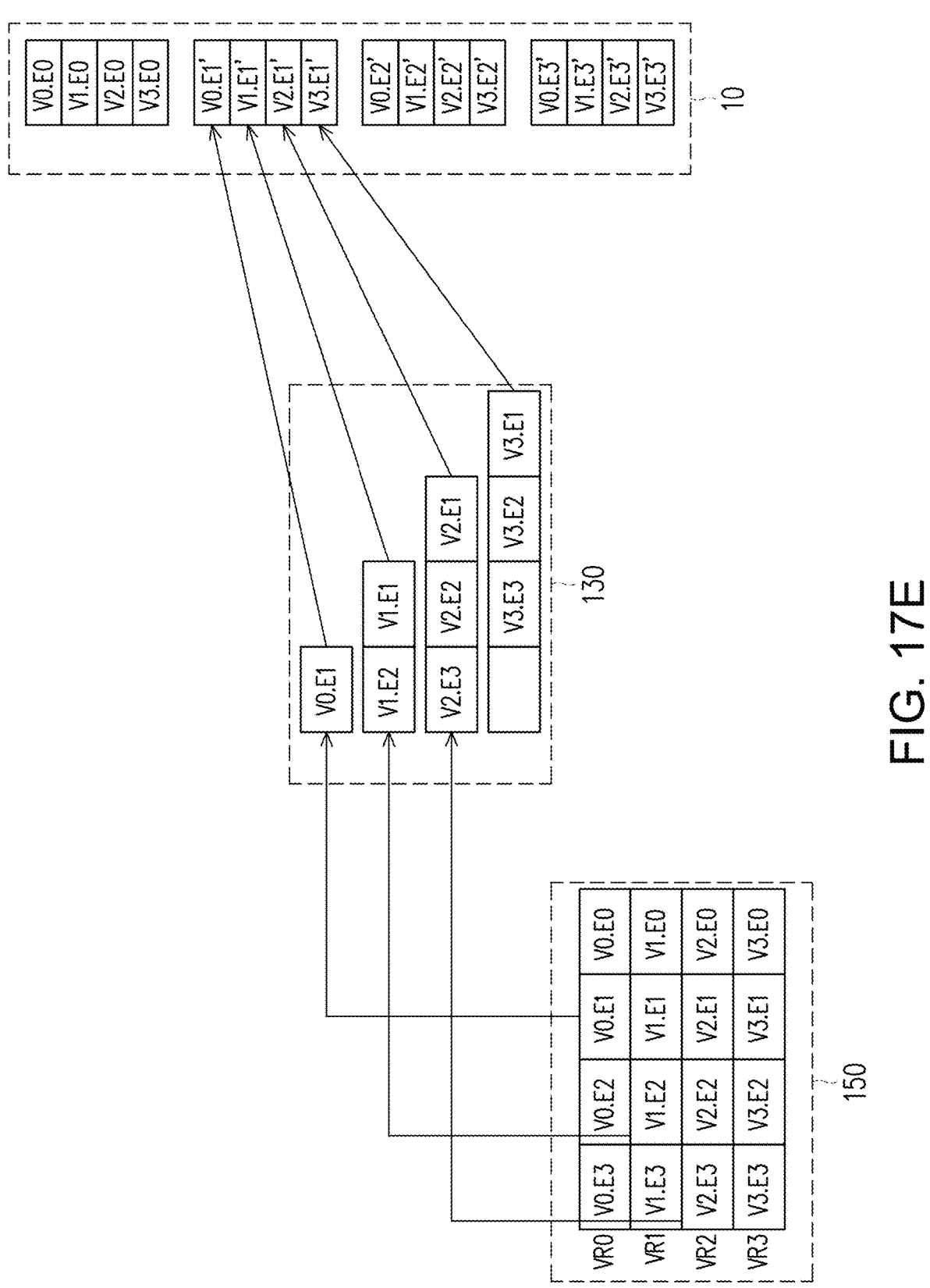

FIG. 17E illustrates the first iteration (x=1) in the VL store iterations. Each register pipeline of the load-store device 130 continues to transfer data elements of each stage to the next stage. In the operating scenario shown in FIG. 17E, the load-store device 130 reads the data element V2.E3 of the third location in the vector register VR2 of the vector register file 150 and stores them to the first stage of the second register pipeline of the register pipelines of the load-store device 130, reads the data element V1.E2 of the second location in the vector register VR1 of the vector register file 150 and stores them to the first stage of the first register pipeline of the register pipelines of the load-store device 130, and reads the data element V0.E1 of the first location in the vector register VR0 of the vector register file 150 and stores them to the first stage of the zeroth register pipeline of the register pipelines of the load-store device 130 within the same read cycle (as shown in FIG. 17E). Next, the load-store device 130 writes the valid data elements V3.E1, V2.E1, V1.E1, and V0.E1 of the final stages of the register pipelines in the first target segment in the VL target segments of the memory 10 within the same store cycle. Therefore, the data elements "V3.E1', V2.E1', V1.E1', and V0.E1'" in the first target segment of the memory 10 are updated to "V3.E1, V2.E1, V1.E1, and V0.E1" (as shown in FIG. 17F).

Figure 17F:
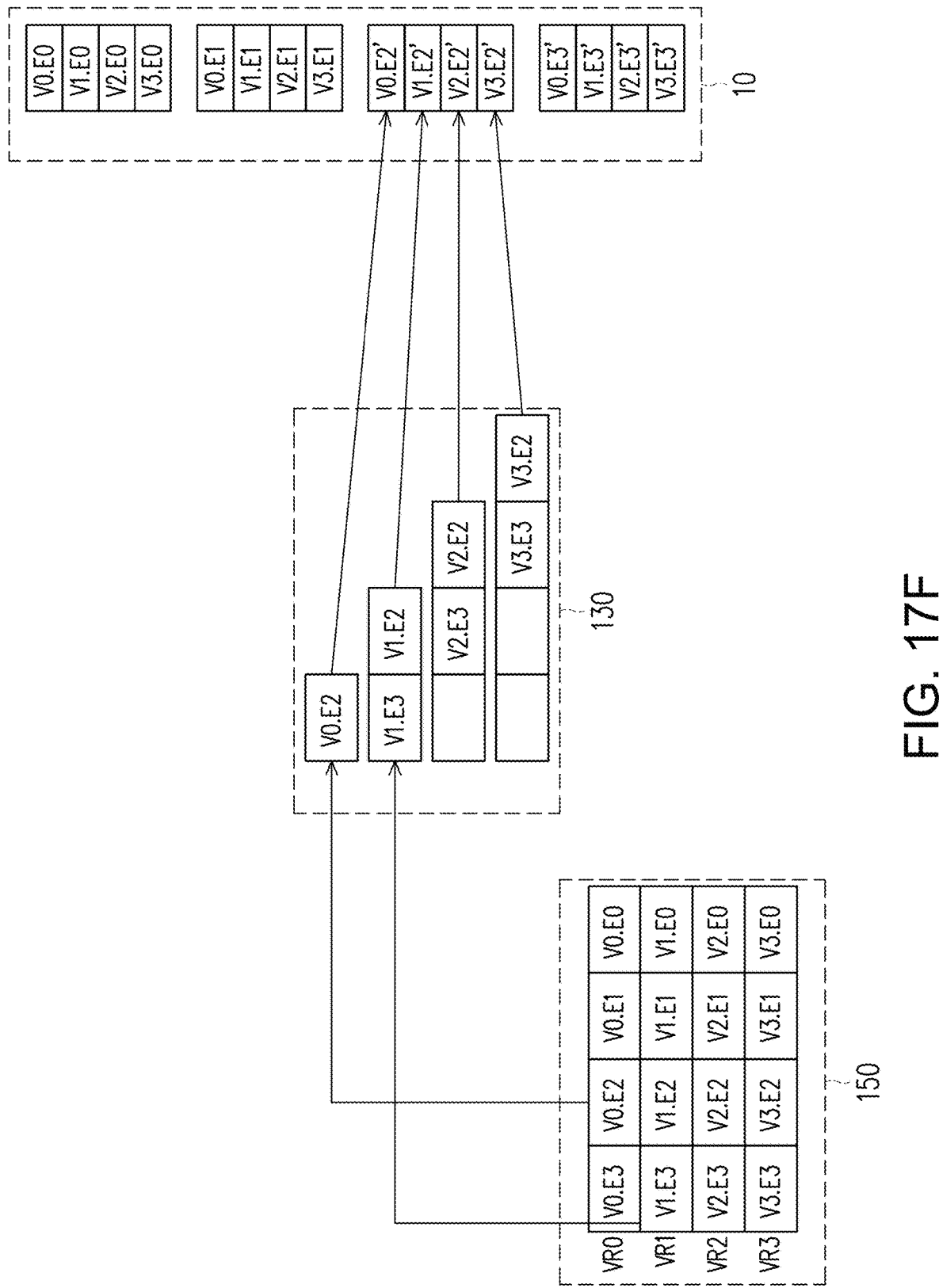

FIG. 17F illustrates the second iteration (x=2) in the VL store iterations. Each register pipeline of the load-store device 130 continues to transfer data elements of each stage to the next stage. In the operating scenario shown in FIG. 17F, the load-store device 130 reads the data element V1.E3 of the third location in the vector register VR1 of the vector register file 150 and stores them to the first stage of the first register pipeline of the register pipelines of the load-store device 130 and reads the data element V0.E2 of the second location in the vector register VR0 of the vector register file 150 and stores them to the first stage of the zeroth register pipeline of the register pipelines of the load-store device 130 within the same read cycle (as shown in FIG. 17F). Next, the load-store device 130 writes the valid data elements V3.E2, V2.E2, V1.E2, and V0.E2 of the final stages of the register pipelines in the second target segment in the VL target segments of the memory 10 within the same store cycle. Therefore, the data elements "V3.E2', V2.E2', V1.E2', and V0.E2'" in the second target segment of the memory 10 are updated to "V3.E2, V2.E2, V1.E2, and V0.E2" (as shown in FIG. 17G).

Figure 17G:
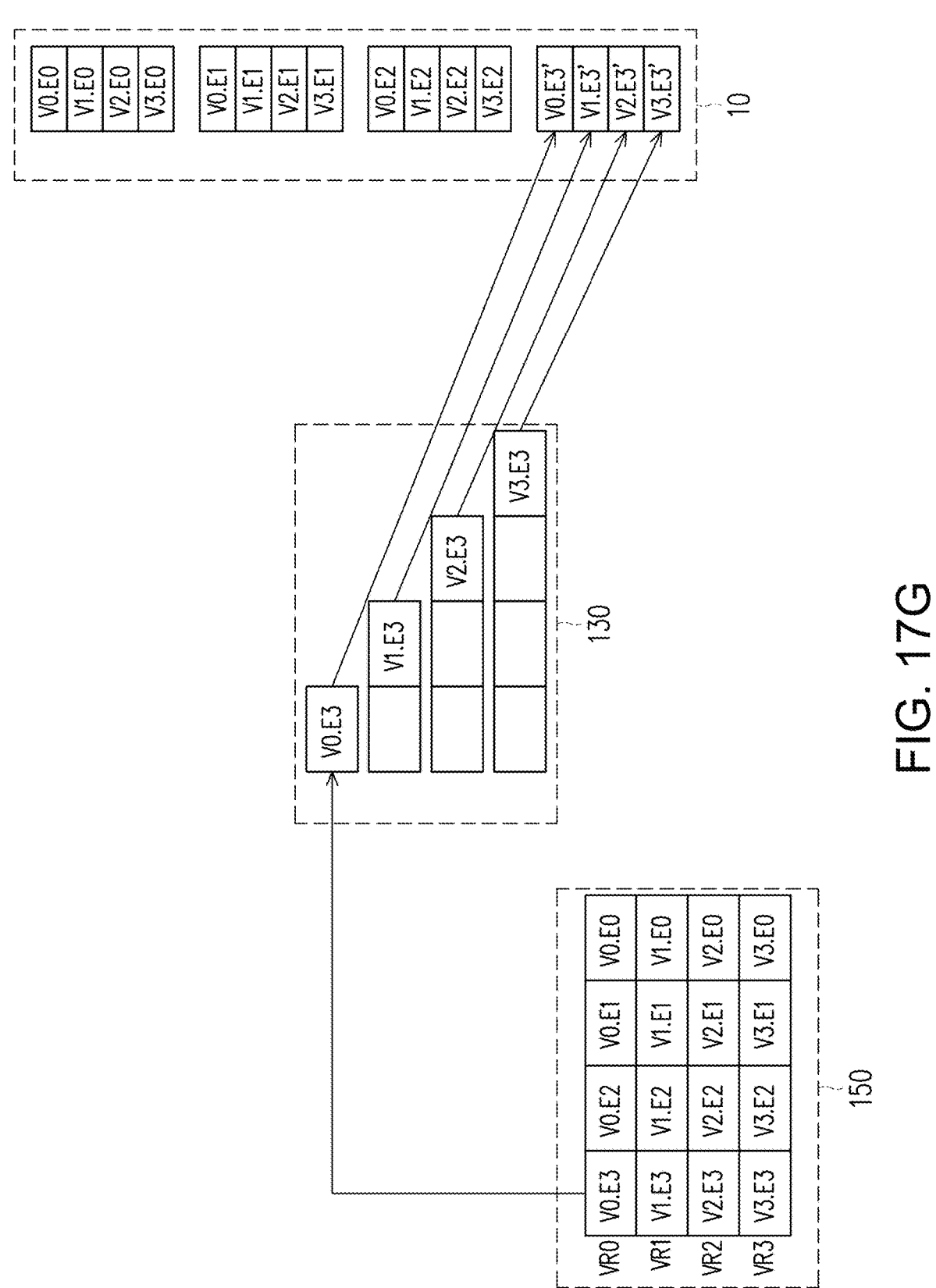

FIG. 17G illustrates the third iteration (x=3) in the VL store iterations. Each register pipeline of the load-store device 130 continues to transfer data elements of each stage to the next stage. In the operating scenario shown in FIG. 17G, the load-store device 130 reads the data element V0.E3 of the third location in the vector register VR0 of the vector register file 150 and stores them to the first stage of the zeroth register pipeline of the register pipelines of the load-store device 130 (as shown in FIG. 17G). Next, the load-store device 130 writes the valid data elements V3.E3, V2.E3, V1.E3, and V0.E3 of the final stages of the register pipelines in the third target segment in the VL target segments of the memory 10 within the same store cycle. Therefore, the data elements "V3.E3', V2.E3', V1.E3', and V0.E3'" in the third target segment of the memory 10 are updated to "V3.E3, V2.E3, V1.E3, and V0.E3".

Based on the above, the load-store device 130 may access a plurality of data elements of the same segment of the memory 10 within the same cycle. Generally, data elements of the same location in different vector registers are stored in the same segment of the memory as different field data. In some embodiments, the load-store device 130 may temporarily store different data elements using a plurality of register pipelines having different numbers of stages. When multi-segment load is performed, a plurality of data elements of the same segment of the memory 10 are temporarily stored in the first stages of the register pipelines, and the final stages of the register pipelines output different field data (data elements) from different source segments of the memory 10 to different locations in different vector registers of the vector register file 150 within one write cycle. When multi-segment store is performed, data elements of different locations in different vector registers of the vector register file 150 are read out to the first stages of the register pipelines within one read cycle, and the final stages of the register pipelines output data elements from the same location in different vector registers of the vector register file 150 to the same target segment of the memory 10. Therefore, the load-store device 130 may load a plurality of vectors from the memory 10 to the vector register file 150 and (or) store a plurality of vectors from the vector register file 150 to the memory 10.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A processor suitable for accessing a memory, the processor comprising:

a vector register file; and a load-store device coupled to the vector register file, wherein the load-store device performs a multi-segment access on the memory, when the multi-segment access is a multi-segment load, the load-store device reads a plurality of first data elements from a first source segment of the memory, and the load-store device writes the first data elements in the vector register file within a same write cycle, so that the first data elements are written in a same location in different vector registers of the vector register file; and when the multi-segment access is a multi-segment store, the load-store device reads a plurality of second data elements from the vector register file within a same read cycle, the second data elements are data elements of a same location in different vector registers of the vector register file, and the load-store device writes the second data elements in a second target segment of the memory, wherein the load-store device comprises:

a left rotation circuit coupled to the vector register file, wherein the left rotation circuit rotates data elements of different vector registers of the vector register file in a left direction by different rotation amounts;

a right rotation circuit coupled to the vector register file, wherein the right rotation circuit rotates data elements of different vector registers of the vector register file in a right direction by different rotation amounts; and a multiplexer, wherein a first selection terminal of the multiplexer is coupled to an output terminal of the left rotation circuit, a second selection terminal of the multiplexer is coupled to an output terminal of the right rotation circuit, and an output terminal of the multiplexer is coupled to the vector register file.

2. The processor of claim 1, wherein when the multi-segment access is the multi-segment load:

the load-store device performs a first rotation in a first direction on a plurality of data elements of different vector registers of the vector register file by different rotation amounts;

after the first rotation, the load-store device performs a write operation to write the first data elements in different locations in different vector registers of the vector register file within a same write cycle; and after the write operation, the load-store device rotates data elements of different vector registers of the vector register file in a second direction by different rotation amounts, so that the first data elements are placed at a same location in different vector registers of the vector register file.

3. The processor of claim 2, wherein the operation of the first rotation comprises:

rotating contents of a vector register VD[N] in a left direction by a rotation amount "EEW*N", wherein the EEW is an effective element width, a unit of the effective element width is bits, a number of fields of the first source segment is NFIELDS fields, the NFIELDS is an integer greater than 1, the N is an integer from 0 to NFIELDS−1, and the vector register VD[N] is one of the different vector registers of the vector register file.

4. The processor of claim 2, wherein the load-store device performs VL load iterations to load contents of VL source segments of the memory into the different vector registers of the vector register file, the VL is a vector length, a unit of the VL is a number of elements, a J-th iteration in the VL load iterations writes the first data elements in different locations in different vector registers of the vector register file within the same write cycle, the J is an integer from 0 to VL−1, and the J-th iteration comprises:

reading a plurality of data elements M_D[J][0] to M_D[J][NFIELDS−1] from a J-th source segment in the VL source segments of the memory, wherein a number of fields in each of the VL source segments is NFIELDS fields, the NFIELDS is an integer greater than 1, the M_D[J][0] is a data element of a field 0 in the J-th source segment of the memory, and the M_D[J][N-FIELDS−1] is a data element of a field NFIELDS−1 in the J-th source segment of the memory; and writing the data elements M_D[J][0] to M_D[J][NFIELDS−1] in different locations in different vector registers of the vector register file within the same write cycle, wherein an N-th data element M_D[J][N] in the data elements M_D[J][0] to M_D[J][NFIELDS−1] is written in a ((J+N) MOD (VLEN/EEW))-th element location in an N-th vector register VD[N] of the vector register file, the VLEN is a vector register length, the EEW is an effective element width, and the N is an integer from 0 to NFIELDS−1.

5. The processor of claim 2, wherein the load-store device performs VL load iterations to load contents of VL source segments of the memory into the different vector registers of the vector register file, the VL is a vector length, a unit of the VL is a number of elements, a J-th iteration in the VL load iterations writes the first data elements in different locations in different vector registers of the vector register file within the same write cycle, the J is an integer from 0 to VL−1, and the J-th iteration comprises:

reading a plurality of data elements M_D[J][0] to M_D[J][NFIELDS−1] from a J-th source segment in the VL source segments of the memory, wherein a number of fields in each of the VL source segments is NFIELDS fields, the NFIELDS is an integer greater than 1, the M_D[J][0] is a data element of field 0 in the J-th source segment of the memory, and the M_D[J][NFIELDS−1] is a data element of field NFIELDS−1 in the J-th source segment of the memory;

checking a vector mask;

writing the data elements M_D[J][0] to M_D[J][NFIELDS−1] in different locations in different vector registers of the vector register file within the same write cycle in response to a J-th bit in the vector mask being a first value, wherein an N-th data element M_D[J][N] in the data elements M_D[J][0] to M_D[J][NFIELDS−1] is written in a ((J+N) MOD (VLEN/EEW))-th element location in an N-th vector register VD[N] of the vector register file, the VLEN is a vector register length, the EEW is an effective element width, and the N is an integer from 0 to NFIELDS−1; and maintaining contents of the ((J+N) MOD (VLEN/EEW))-th element location in the N-th vector register VD[N], or writing a constant value in the ((J+N) MOD (VLEN/EEW))-th element location in the N-th vector register VD[N] in response to the J-th bit in the vector mask being a second value;

checking a vector field mask;

writing an N-th data element M_D[J][N] in the data elements M_D[J][0] to M_D[J][NFIELDS−1] in the ((J+N) MOD (VLEN/EEW))-th element location in the N-th vector register VD[N] of the vector register file within the same write cycle in response to an N-th bit in the vector field mask being a third value; and maintaining contents of the ((J+N) MOD (VLEN/EEW))-th element location in the N-th vector register VD[N], or writing the constant value in the ((J+N) MOD (VLEN/EEW))-th element location in the N-th vector register VD[N] in response to the N-th bit in the vector field mask being a fourth value.

6. The processor of claim 2, wherein the operation of rotating the data elements of different vector registers of the vector register file in the second direction comprises:

rotating contents of a vector register VD[N] in a right direction by a rotation amount "EEW*N", wherein the EEW is an effective element width, a unit of the effective element width is bits, a number of fields of the first source segment is NFIELDS fields, the NFIELDS is an integer greater than 1, the N is an integer from 0 to NFIELDS−1, and the vector register VD[N] is one of the different vector registers of the vector register file.

7. The processor of claim 1, wherein when the multi-segment access is the multi-segment store:

the load-store device performs a first rotation in a first direction on a plurality of data elements of different vector registers of the vector register file by different rotation amounts; and after the first rotation, the load-store device performs a read operation to read the second data elements from different locations in different vector registers of the vector register file within a same read cycle.

8. The processor of claim 7, wherein the operation of the first rotation comprises:

rotating contents of a vector register VS[N] in a left direction by a rotation amount "EEW*N", wherein the EEW is an effective element width, a unit of the effective element width is bits, a number of fields of the second target segment is NFIELDS fields, the NFIELDS is an integer greater than 1, the N is an integer from 0 to NFIELDS−1, and the vector register VS[N] is one of the different vector registers of the vector register file.

9. The processor of claim 7, wherein the load-store device performs VL store iterations to store contents of the different vector registers of the vector register file into VL target segments of the memory, the VL is a vector length, a unit of the VL is a number of elements, a J-th iteration in the VL store iterations reads the second data elements from the vector register file to be written in the second target segment of the memory within the same read cycle, the J is an integer from 0 to VL−1, and the J-th iteration comprises:

reading data elements from different locations in different vector registers of the vector register file within the same read cycle, wherein the different vector registers of the vector register file comprise an N-th vector register VS[N], a data element of a ((J+N) MOD (VLEN/EEW))-th element location in the N-th vector register VS[N] is VS[N][(J+N) MOD (VLEN/EEW)], the VLEN is a vector register length, the EEW is an effective element width, a number of fields in each of the VL target segments is NFIELDS fields, the NFIELDS is an integer greater than 1, and the N is an integer from 0 to NFIELDS−1; and writing data elements of different locations in different vector registers of the vector register file in a J-th target segment in the VL target segments of the memory as a plurality of data elements M_D[J][0] to M_D[J][NFIELDS−1] of the J-th target segment, wherein the M_D[J][0] is a data element of field 0 in the J-th target segment of the memory, the M_D[J][NFIELDS−1] is a data element of field NFIELDS−1 in the J-th target segment of the memory, and a data element VS[N][(J+N) MOD (VLEN/EEW)] of the ((J+N) MOD (VLEN/EEW))-th element location in the N-th vector register VS[N] is written in the J-th target segment of the memory as an N-th data element M_D[J][N] in the data elements M_D[J][0] to M_D[J][NFIELDS−1].

10. The processor of claim 7, wherein the load-store device performs VL store iterations to store contents of the different vector registers of the vector register file into VL target segments of the memory, the VL is a vector length, a unit of the VL is a number of elements, a J-th iteration in the VL store iterations reads the second data elements from the vector register file to be written in the second target segment of the memory within the same read cycle, the J is an integer from 0 to VL−1, and the J-th iteration comprises:

checking a vector mask;

reading data elements from different locations in different vector registers of the vector register file within the same read cycle in response to a J-th bit in the vector mask being a first value, wherein the different vector registers of the vector register file comprise an N-th vector register VS[N], a data element of a ((J+N) MOD (VLEN/EEW))-th element location in the N-th vector register VS[N] is VS[N][(J+N) MOD (VLEN/EEW)], the VLEN is a vector register length, the EEW is an effective element width, a number of fields in each of the VL target segments is NFIELDS fields, the NFIELDS is an integer greater than 1, and the N is an integer from 0 to NFIELDS−1;

writing data elements of different locations in different vector registers of the vector register file in a J-th target segment in the VL target segments of the memory as a plurality of data elements M_D[J][0] to M_D[J][NFIELDS−1] of the J-th target segment in response to the J-th bit in the vector mask being the first value, wherein the M_D[J][0] is a data element of field 0 in the J-th target segment of the memory, the M_D[J][NFIELDS−1] is a data element of field NFIELDS−1 in the J-th target segment of the memory, and a data element VS[N][(J+N) MOD (VLEN/EEW)] of the ((J+N) MOD (VLEN/EEW))-th element location in the N-th vector register VS[N] is written in the J-th target segment of the memory as an N-th data element M_D[J][N] in the data elements M_D[J][0] to M_D[J][NFIELDS−1];

skipping a reading of the ((J+N) MOD (VLEN/EEW))-th element location in the N-th vector register VS[N] in response to the J-th bit in the vector mask being a second value;

skipping a memory write of the J-th iteration in response to the J-th bit in the vector mask being the second value;

checking a vector field mask;

writing a data element VS[N][(J+N) MOD (VLEN/EEW)] of the ((J+N) MOD (VLEN/EEW))-th element location in the N-th vector register VS[N] in the J-th target segment of the memory as the N-th data element M_D[J][N] in the data elements M_D[J][0] to M_D[J][NFIELDS−1] in response to an N-th bit in the vector field mask being a third value; and skipping a memory write of the N-th data element M_D[J][N] in response to the N-th bit in the vector field mask being a fourth value.

11. The processor of claim 7, wherein the operation of the first rotation comprises:

rotating contents of a vector register VS[N] in a right direction by a rotation amount "EEW*(NFIELDS−1−N)", wherein the EEW is an effective element width, a unit of the effective element width is bits, the NFIELDS is a number of fields of the second target segment, the NFIELDS is an integer greater than 1, the Nis an integer from 0 to NFIELDS−1, and the vector register VS[N] is one of the different vector registers of the vector register file.

12. The processor of claim 7, wherein the load-store device performs VL store iterations to store contents of the different vector registers of the vector register file into VL target segments of the memory, the VL is a vector length, a unit of the VL is a number of elements, a J-th iteration in the VL store iterations reads the second data elements from the vector register file to write in the second target segment of the memory within the same read cycle, the J is an integer from 0 to VL−1, and the J-th iteration comprises:

reading data elements from different locations in different vector registers of the vector register file within the same read cycle, wherein the different vector registers of the vector register file comprise an N-th vector register VS[N], a data element of a ((J+N−(NFIELDS−1)+(VLEN/EEW)) MOD (VLEN/EEW))-th element location in the N-th vector register VS[N] is VS[N][(J+N−(NFIELDS−1)+(VLEN/EEW)) MOD (VLEN/EEW)], the VLEN is a vector register length, the EEW is an effective element width, a number of fields in each of the VL target segments is NFIELDS fields, the NFIELDS is an integer greater than 1, and the Nis an integer from 0 to NFIELDS−1; and writing data elements of different locations in different vector registers of the vector register file in a J-th target segment in the VL target segments of the memory as a plurality of data elements M_D[J][0] to M_D[J][NFIELDS−1] of the J-th target segment, wherein the M_D[J][0] is a data element of field 0 in the J-th target segment of the memory, the M_D[J][NFIELDS−1] is a data element of field NFIELDS−1 in the J-th target segment of the memory, and a data element VS[N][(J+N−(NFIELDS−1)+(VLEN/EEW)) MOD (VLEN/EEW)] of the ((J+N−(NFIELDS−1)+(VLEN/EEW)) MOD (VLEN/EEW))-th element location in the N-th vector register VS[N] is written in the J-th target segment of the memory as an N-th data element M_D[J][N] in the data elements M_D[J][0] to M_D[J][NFIELDS−1].

13. The processor of claim 7, wherein the load-store device performs VL store iterations to store contents of the different vector registers of the vector register file into VL target segments of the memory, the VL is a vector length, a unit of the VL is a number of elements, a J-th iteration in the VL store iterations reads the second data elements from the vector register file to be written in the second target segment of the memory within the same read cycle, the J is an integer from 0 to VL−1, and the J-th iteration comprises:

checking a vector mask;

reading data elements from different locations in different vector registers of the vector register file within the same read cycle in response to a J-th bit in the vector mask being a first value, wherein the different vector registers of the vector register file comprise an N-th vector register VS[N], a data element of a ((J+N−(NFIELDS−1)+(VLEN/EEW)) MOD (VLEN/EEW))-th element location in the N-th vector register VS[N] is VS[N][(J+N−(NFIELDS−1)+(VLEN/EEW)) MOD (VLEN/EEW)], the VLEN is a vector register length, the EEW is an effective element width, a number of fields in each of the VL target segments is NFIELDS fields, the NFIELDS is an integer greater than 1, and the N is an integer from 0 to NFIELDS−1;

writing data elements of different locations in different vector registers of the vector register file in a J-th target segment in the VL target segments of the memory as a plurality of data elements M_D[J][0] to M_D[J][NFIELDS−1] of the J-th target segment in response to the J-th bit in the vector mask being the first value, wherein the M_D[J][0] is a data element of field 0 in the J-th target segment of the memory, the M_D[J][NFIELDS−1] is a data element of field NFIELDS−1 in the J-th target segment of the memory, and a data element VS[N][(J+N−(NFIELDS−1)+(VLEN/EEW)) MOD (VLEN/EEW)] of the ((J+N−(NFIELDS−1)+(VLEN/EEW)) MOD (VLEN/EEW))-th element location in the N-th vector register VS[N] is written in the J-th target segment of the memory as an N-th data element M_D[J][N] in the data elements M_D[J][0] to M_D[J][NFIELDS−1]; and skipping a reading of the ((J+N−(NFIELDS−1)+(VLEN/EEW)) MOD (VLEN/EEW))-th element location in the N-th vector register VS[N] in response to the J-th bit in the vector mask being a second value;

skipping a memory write of the J-th iteration in response to the J-th bit in the vector mask being the second value;

checking a vector field mask;

writing a data element VS[N][(J+N−(NFIELDS−1)+(VLEN/EEW)) MOD (VLEN/EEW)] of the ((J+N−(NFIELDS−1)+(VLEN/EEW)) MOD (VLEN/EEW))-th element location in the N-th vector register in the J-th target segment of the memory as the N-th data element M_D[J][N] in the data elements M_D[J][0] to M_D[J][NFIELDS−1] in response to an N-th bit in the vector field mask being a third value; and skipping a memory write of the N-th data element M_D[J][N] in response to the N-th bit in the vector field mask being a fourth value.

14. The processor of claim 7, wherein when the multi-segment access is the multi-segment store:

after the read operation, the load-store device rotates data elements of different vector registers of the vector register file in a second direction by different rotation amounts, so that the second data elements are placed at a same location in different vector registers of the vector register file.

15. The processor of claim 14, wherein the operation of rotating the data elements of different vector registers of the vector register file in the second direction comprises:

rotating contents of a vector register VS[N] in a right direction by a rotation amount "EEW*N", wherein the EEW is an effective element width, a unit of the effective element width is bits, a number of fields of the second target segment is NFIELDS fields, the NFIELDS is an integer greater than 1, the N is an integer from 0 to NFIELDS−1, and the vector register VS[N] is one of the different vector registers of the vector register file.

16. The processor of claim 14, wherein the operation of rotating the data elements of different vector registers of the vector register file in the second direction comprises:

rotating contents of a vector register VS[N] in a left direction by a rotation amount "EEW*(NFIELDS−1−N)", wherein the EEW is an effective element width, a unit of the effective element width is bits, a number of fields of the second target segment is NFIELDS fields, the NFIELDS is an integer greater than 1, the N is an integer from 0 to NFIELDS−1, and the vector register VS[N] is one of the different vector registers of the vector register file.

17. An operation method of a processor suitable for accessing a memory, wherein the processor comprises a vector register file and a load-store device, the load-store device is coupled to the vector register file, and the operation method comprises:

performing a multi-segment access on the memory via the load-store device;

reading a plurality of first data elements from a first source segment of the memory and writing the first data elements in the vector register file within a same write cycle in response to the multi-segment access being a multi-segment load, so that the first data elements are written in a same location in different vector registers of the vector register file; and reading a plurality of second data elements from the vector register file and writing the second data elements in a second target segment of the memory within a same read cycle in response to the multi-segment access being a multi-segment store, wherein the second data elements are data elements of a same location in different vector registers of the vector register file, wherein the load-store device comprises:

a left rotation circuit coupled to the vector register file, wherein the left rotation circuit rotates data elements of different vector registers of the vector register file in a left direction by different rotation amounts;

a right rotation circuit coupled to the vector register file, wherein the right rotation circuit rotates data elements of different vector registers of the vector register file in a right direction by different rotation amounts; and a multiplexer, wherein a first selection terminal of the multiplexer is coupled to an output terminal of the left rotation circuit, a second selection terminal of the multiplexer is coupled to an output terminal of the right rotation circuit, and an output terminal of the multiplexer is coupled to the vector register file.

18. A processor suitable for accessing a memory, the processor comprising:

a vector register file; and a load-store device coupled to the vector register file, wherein the load-store device comprises a plurality of register pipelines, when the load-store device performs a multi-segment load on the memory, input terminals of the register pipelines are used to receive a plurality of data elements from a same source segment of the memory within a same load cycle, and numbers of stages of the register pipelines are different from each other, so that output terminals of the register pipelines output a plurality of data elements from different source segments of the memory to different locations in different vector registers of the vector register file within a same write cycle; and when the load-store device performs a multi-segment store on the memory, the input terminals of the register pipelines are used to receive a plurality of data elements from different locations in different vector registers of the vector register file within a same read cycle, and numbers of stages of the register pipelines are different from each other, so that the output terminals of the register pipelines output a plurality of data elements from a same location in different vector registers of the vector register file to a same target segment of the memory within a same store cycle.

19. The processor of claim 18, wherein when the load-store device performs the multi-segment load on the memory:

the load-store device performs VL load iterations to load contents of VL source segments of the memory into the register pipelines, and writes overflow contents of the register pipelines in the vector register file, wherein the VL is a vector length, a unit of the VL is a number of elements, an x-th iteration in the VL load iterations loads a plurality of data elements of an x-th source segment in the VL source segments of the memory to the input terminals of the register pipelines, and the x is an integer from 0 to VL−1; and after the VL load iterations, the load-store device performs NFIELDS−1 write iterations to write remaining contents of the register pipelines in the vector register file, wherein the NFIELDS is a number of fields of each source segment of the VL source segments, and the NFIELDS is an integer greater than 1.

20. The processor of claim 19, wherein the x-th iteration in the VL load iterations comprises:

reading a plurality of data elements M_D[x][0] to M_D[x][NFIELDS−1] from an x-th source segment in the VL source segments of the memory, wherein the M_D[x][0] is a data element of field 0 in the x-th source segment of the memory, and the M_D[x][NFIELDS−1] is a data element of field NFIELDS−1 in the x-th source segment of the memory;

loading the data elements M_D[x][0] to M_D[x][NFIELDS−1] and storing them to first stages of the register pipelines; and writing all valid data elements of final stages of the register pipelines in different locations in different vector registers of the vector register file within a same write cycle.

21. The processor of claim 19, wherein the x-th iteration in the VL load iterations comprises:

checking a vector mask;

reading a plurality of data elements M_D[x][0] to M_D[x][NFIELDS−1] from an x-th source segment in the VL source segments of the memory and storing the data elements M_D[x][0] to M_D[x][NFIELDS−1] in first stages of the register pipelines in response to an x-th bit in the vector mask being a first value, wherein the M_D[x][0] is a data element of field 0 in the x-th source segment of the memory, and the M_D[x][NFIELDS−1] is a data element of field NFIELDS−1 in the x-th source segment of the memory;

skipping a reading of the x-th source segment of the memory in the x-th iteration in response to the x-th bit in the vector mask being a second value; and setting the first stages of the register pipelines to invalid in response to the x-th bit in the vector mask being the second value.

22. The processor of claim 19, wherein a y-th iteration in the NFIELDS–1 write iterations comprises:

writing all valid data elements of final stages of the register pipelines in different locations in different vector registers of the vector register file within a same write cycle.

23. The processor of claim 18, wherein when the load-store device performs the multi-segment store on the memory:

the load-store device performs NFIELDS–1 read iterations to read a first portion of data elements of the vector register file into the register pipelines, wherein the NFIELDS is a number of fields of each target segment of the VL target segments of the memory, the NFIELDS is an integer greater than 1, the VL is a vector length, and a unit of the VL is a number of elements; and after the NFIELDS–1 read iterations, the load-store device performs VL store iterations to write remaining contents of the vector register file in the register pipelines and store outputs of the register pipelines to the VL target segments of the memory, wherein an x-th iteration in the VL store iterations stores the outputs of the register pipelines to an x-th target segment in the VL target segments of the memory, and the x is an integer from 0 to VL–1.

24. The processor of claim 23, wherein a zeroth iteration in the NFIELDS–1 read iterations comprises:

storing a data element of a location 0 in an (NFIELDS–1)-th vector register of the vector register file into a first stage of an (NFIELDS–1)-th register pipeline of the register pipelines.

25. The processor of claim 24, wherein a first iteration in the NFIELDS–1 read iterations comprises:

loading a data element of a first location in the (NFIELDS–1)-th vector register of the vector register file and storing them to the first stage of the (NFIELDS–1)-th register pipeline of the register pipelines and storing a data element of a zeroth location in an (NFIELDS–2)-th vector register of the vector register file to a first stage of an (NFIELDS–2)-th register pipeline of the register pipelines within a same read cycle.

26. The processor of claim 23, wherein the x-th iteration in the VL store iterations comprises:

storing a plurality of data elements of different locations in different vector registers of the vector register file into first stages of the register pipelines within a same read cycle; and writing all valid data elements of final stages of the register pipelines in the x-th target segment in the VL target segments of the memory.

27. The processor of claim 23, wherein the x-th iteration in the VL store iterations comprises:

checking a vector mask;

writing all valid data elements of final stages of the register pipelines in the x-th target segment in the VL target segments of the memory within a same read cycle in response to an x-th bit in the vector mask being a first value; and skipping a memory write of the x-th target segment of the memory by the x-th iteration in response to the x-th bit in the vector mask being a second value.

* * * * *